United States Patent
Blum et al.

(10) Patent No.: US 7,926,941 B2
(45) Date of Patent: Apr. 19, 2011

(54) MULTIPLE LAYER MULTIFOCAL COMPOSITE LENS

(75) Inventors: Ronald D. Blum, Roanoke, VA (US); William Kokonaski, Gig Harbor, WA (US); Joshua N. Haddock, Roanoke, VA (US); Venkatramani S. Iyer, Roanoke, VA (US); Mark Mattison-Shupnick, Petaluma, CA (US)

(73) Assignee: PixelOptics Inc., Roanoke, VA (US)

( * ) Notice: Subject to any disclaimer, the term of this patent is extended or adjusted under 35 U.S.C. 154(b) by 142 days.

(21) Appl. No.: 12/275,801

(22) Filed: Nov. 21, 2008

(65) Prior Publication Data
US 2009/0153795 A1 Jun. 18, 2009

Related U.S. Application Data

(63) Continuation-in-part of application No. 12/059,908, filed on Mar. 31, 2008, now abandoned, which is a continuation-in-part of application No. 11/964,030, filed on Dec. 25, 2007.

(60) Provisional application No. 61/013,822, filed on Dec. 14, 2007, provisional application No. 61/025,477, filed on Feb. 1, 2008, provisional application No. 61/037,958, filed on Mar. 19, 2008, provisional application No. 61/041,094, filed on Mar. 31, 2008, provisional application No. 61/044,802, filed on Apr. 14, 2008, provisional application No. 61/047,614, filed on Apr. 24, 2008, provisional application No. 61/047,888, filed on Apr. 25, 2008, provisional application No. 61/048,851, filed on Apr. 29, 2008, provisional application No. 61/048,860, filed on Apr. 29, 2008, provisional application No. 61/048,862, filed on Apr. 29, 2008, provisional application No. 61/052,034, filed on May 9, 2008, provisional application No. 61/052,700, filed on May 13, 2008, provisional application No. 61/053,734, filed on May 16, 2008, provisional application No. 61/054,379, filed on May 19, 2008, provisional application No. 61/056,663, filed on May 28, 2008, provisional application No. 61/078,986, filed on Jul. 8, 2008.

(51) Int. Cl.
*G02C 7/06* (2006.01)
(52) U.S. Cl. ......... 351/168; 351/169; 351/171; 351/172
(58) Field of Classification Search .................. 351/168, 351/171
See application file for complete search history.

(56) References Cited

U.S. PATENT DOCUMENTS
3,248,460 A 4/1966 Naujokas
(Continued)

FOREIGN PATENT DOCUMENTS
EP 0 578 833 A1 1/1994
(Continued)

OTHER PUBLICATIONS
International Search Report of Application No. PCT/US08/86459 Mailed on Mar. 18, 2009.
(Continued)

*Primary Examiner* — Jordan M. Schwartz
(74) *Attorney, Agent, or Firm* — Kilpatrick Townsend & Stockton LLP

(57) ABSTRACT

Aspects of the present invention provide multiple-layer (multi-layer) composite lenses comprising two or more materials and methods for making the same. A multi-layer composite lens of the present invention can use multiple surfaces (internal or external) to form optical elements that can contribute to a total desired add power. The multiple contributing optical elements can be aligned so as to be in optical communication to form multiple stable vision zones to enhance optical performance and the vision experience of the wearer. Distributing the total desired add power across multiple appropriately aligned optical elements that are in optical communication with one another can reduce the total distortion of the lens, minimize the number of optical discontinuities introduced, can reduce optical power jump as experienced by the wearer's eye when traversing any discontinuity, and can reduce the visibility of any introduced optical discontinuity as perceived by an observer looking at the wearer.

20 Claims, 22 Drawing Sheets

U.S. PATENT DOCUMENTS

| | | | |
|---|---|---|---|
| 4,062,629 A | 12/1977 | Winthrop | |
| 4,190,621 A | 2/1980 | Greshes | |
| 4,461,550 A | 7/1984 | Legendre | |
| 4,869,588 A | 9/1989 | Frieder et al. | |
| 4,873,029 A | 10/1989 | Blum | |
| 4,952,048 A | 8/1990 | Frieder et al. | |
| 5,147,585 A | 9/1992 | Blum | |
| 5,178,800 A | 1/1993 | Blum | |
| 5,219,497 A | 6/1993 | Blum | |
| 5,305,028 A | 4/1994 | Okano | |
| 5,512,371 A | 4/1996 | Gupta et al. | |
| 5,702,819 A | 12/1997 | Gupta et al. | |
| 5,856,860 A | 1/1999 | Bhalakia et al. | |
| 5,859,685 A | 1/1999 | Gupta et al. | |
| 5,861,934 A | 1/1999 | Blum et al. | |
| 6,086,203 A | 7/2000 | Blum et al. | |
| 6,139,148 A | 10/2000 | Menezes | |
| 6,199,984 B1 | 3/2001 | Menezes | |
| 6,242,065 B1 | 6/2001 | Bloomberg et al. | |
| 6,270,220 B1 | 8/2001 | Keren | |
| 6,652,096 B1 | 11/2003 | Morris et al. | |
| 6,709,107 B2 | 3/2004 | Jiang et al. | |
| 6,793,340 B1 | 9/2004 | Morris et al. | |
| 6,859,333 B1 | 2/2005 | Ren et al. | |
| 6,886,938 B1 | 5/2005 | Menezes | |
| 6,918,670 B2 | 7/2005 | Blum et al. | |
| 7,159,981 B2 | 1/2007 | Kato | |
| 7,472,993 B2 | 1/2009 | Matsui | |
| 2003/0086056 A1 | 5/2003 | Gupta et al. | |
| 2004/0233384 A1 | 11/2004 | Gupta et al. | |
| 2005/0099596 A1 | 5/2005 | Kato | |
| 2006/0066808 A1 | 3/2006 | Blum et al. | |
| 2009/0091705 A1 | 4/2009 | Matsui | |
| 2009/0268156 A1* | 10/2009 | Ezekiel | 351/161 |

FOREIGN PATENT DOCUMENTS

| | | |
|---|---|---|
| JP | 7028002 | 1/1995 |
| JP | 2007-323062 | 12/2007 |
| WO | WO 93/21010 | 10/1993 |

OTHER PUBLICATIONS

International Search Report of Application No. PCT/US09/32086 Mailed on Mar. 13, 2009.

* cited by examiner

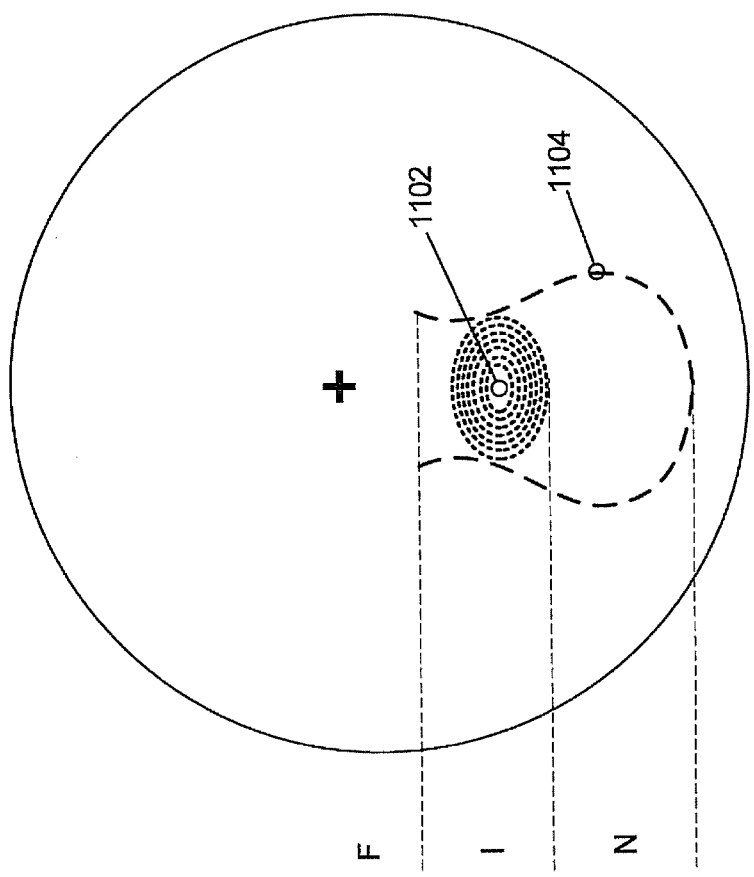
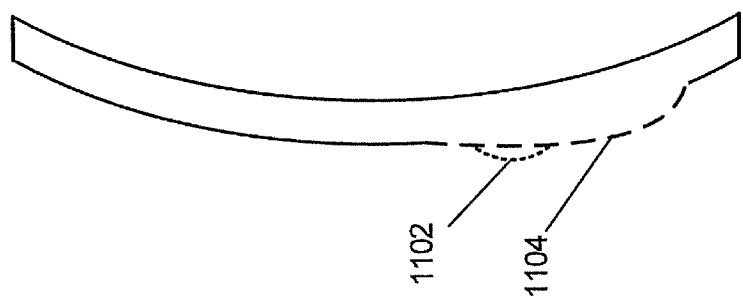
FRONT VIEW
PRIOR ART
FIG. 11
SIDE VIEW

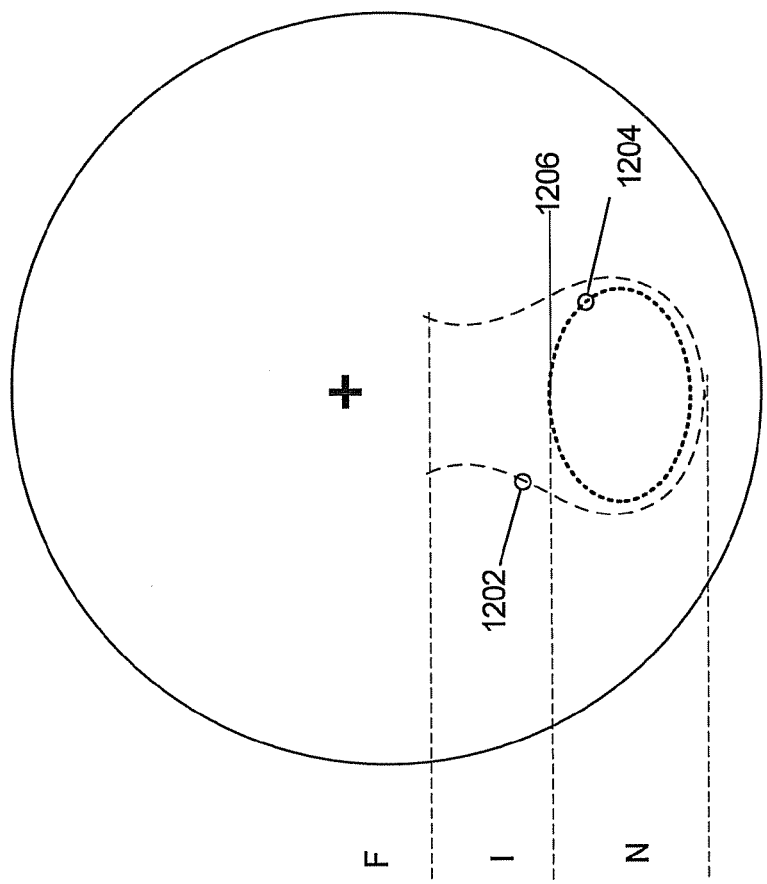
FRONT VIEW
PRIOR ART
FIG. 12
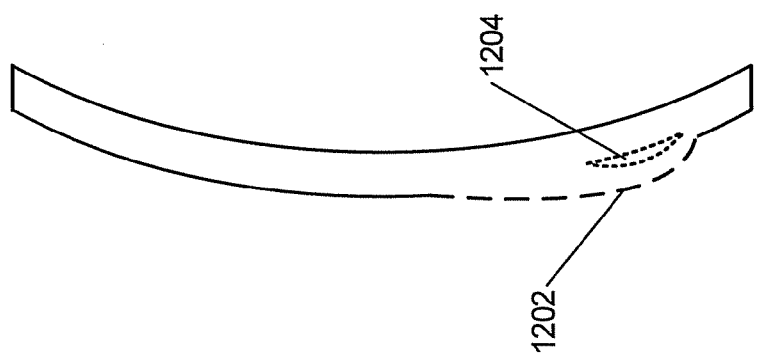
SIDE VIEW

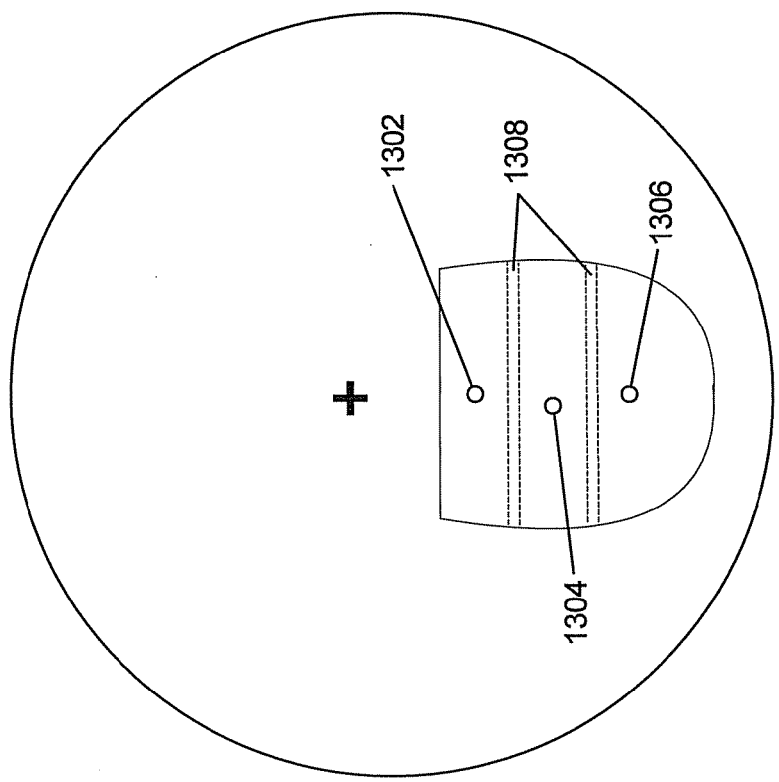
FRONT VIEW
PRIOR ART
FIG. 13
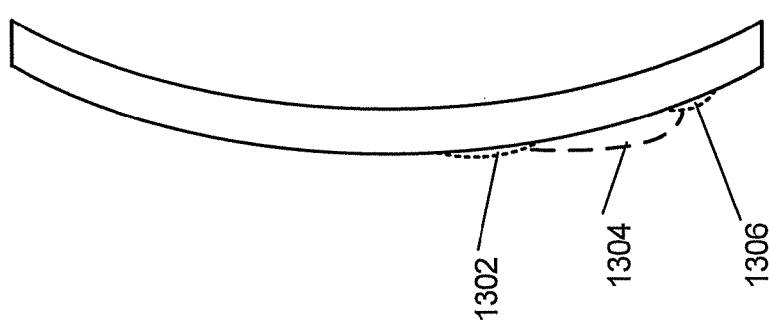
SIDE VIEW

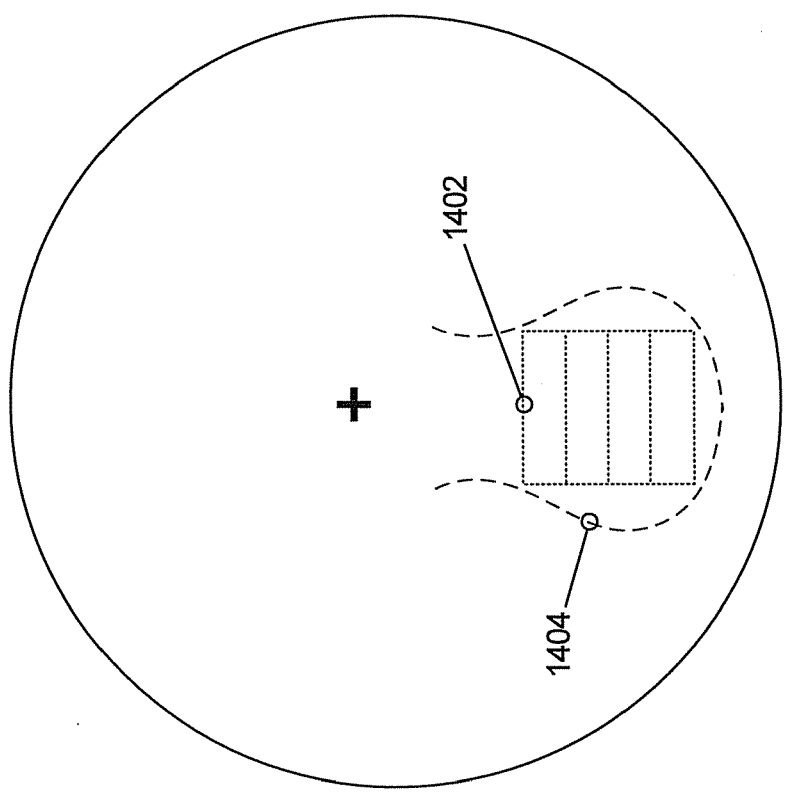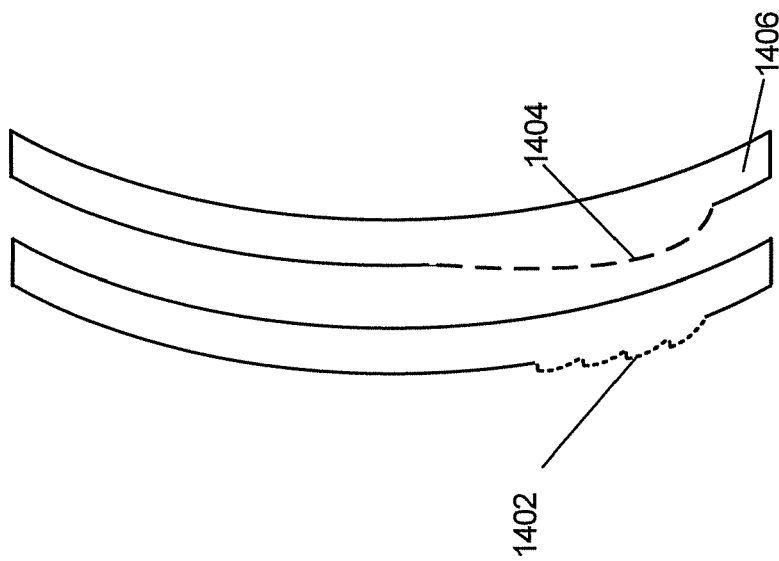
PRIOR ART
FIG. 14

MULTIPLE LAYER MULTIFOCAL COMPOSITE LENS

CROSS-REFERENCE TO RELATED APPLICATIONS

This application is a continuation-in-part of U.S. application Ser. No. 12/059,908, filed on Mar. 31, 2008, now abandoned which is a continuation-in-part of U.S. application Ser. No. 11/964,030, filed on Dec. 25, 2007, each of which is incorporated by reference in their entirety.

This application claims priority from and incorporates by reference in their entirety the following provisional applications:

U.S. application Ser. No. 61/013,822, filed on Dec. 14, 2007;
U.S. application Ser. No. 61/025,477, filed on Feb. 1, 2008;
U.S. application Ser. No. 61/037,958, filed on Mar. 19, 2008;
U.S. application Ser. No. 61/041,094, filed on Mar. 31, 2008;
U.S. application Ser. No. 61/044,802, filed on Apr. 14, 2008;
U.S. application Ser. No. 61/047,614, filed on Apr. 24, 2008;
U.S. application Ser. No. 61/047,888, filed on Apr. 25, 2008;
U.S. application Ser. No. 61/048,851, filed on Apr. 29, 2008;
U.S. application Ser. No. 61/048,860, filed on Apr. 29, 2008;
U.S. application Ser. No. 61/048,862, filed on Apr. 29, 2008;
U.S. application Ser. No. 61/052,034, filed on May 9, 2008;
U.S. application Ser. No. 61/052,700, filed on May 13, 2008;
U.S. application Ser. No. 61/053,734, filed on May 16, 2008;
U.S. application Ser. No. 61/054,379, filed on May 19, 2008;
U.S. application Ser. No. 61/056,663, filed on May 28, 2008; and
U.S. application Ser. No. 61/078,986, filed on Jul. 8, 2008.

BACKGROUND OF THE INVENTION

1. Field of the Invention

The present invention generally relates to lenses. More specifically, the present invention provides lenses having multiple vision zones with reduced distortion and reduced visibility of any included discontinuities.

2. Background Art

Multifocal lenses generally have two or more adjacent regions of different optical power to provide multiple vision zones. Examples of traditional multifocal lenses include bifocals, trifocals, and progressive addition lenses. The multiple vision zones of a multifocal lens allow a wearer to more clearly view differently spaced objects using different vision zone correction prescriptions. A typical wearer of a multifocal lens may have a first vision correction prescription for viewing distant objects and a second vision correction prescription for viewing near objects.

Many multifocal lenses are lined lenses. That is, many multifocal lenses have a discontinuity separating each vision zone that can be seen by someone looking at a wearer of the lens. As a result, many individuals find lined multifocals to be cosmetically unappealing. Additionally, a wearer of a lined multifocal lens will perceive the effects of traversing the multiple discontinuities when the wearer's line of sight crosses the boundaries of the vision zones. The traversal of any such discontinuity can cause an image jump perceptible to the wearer. Experiencing an image jump can be visually disturbing and distracting to the wearer. Accordingly, experiencing multiple image jumps in a multifocal lens that provides two or more vision zones exacerbates the discomfort of the user.

Blended multifocals can reduce the effects of the abrupt discontinuity between two adjacent regions of different optical powers. Generally, a blend zone is provided between the two different optical power regions to provide a relatively smooth transition from the optical power of the initial zone to the optical power of the adjacent zone. Such blending can improve the aesthetics of a multifocal lens by reducing the visibility of the discontinuity between the adjacent regions. However, blend zones are typically unusable portions of a lens due to poor resulting optics associated with the blend zone. Therefore, using a blend zone to reduce the visibility of an optical discontinuity can reduce the usability of the vision zones of a multifocal lens by reducing their size. Further, blend zones can introduce their own unique disturbances as experienced by a wearer when traversed by a wearer's line of sight. Such disturbances can be introduced by the blending of the optical power which can create unwanted astigmatism and distortion across the blend zone.

Due to the disadvantages of traditional multifocals (lined or blended), many individuals opt to wear multiple pairs of spectacle lenses or choose to wear a progressive lens. Progressive lenses generally provide a smooth continuous change in optical power between different regions of a lens. While many individuals find progressive lenses to be more appealing cosmetically, they too are often accompanied by many disadvantages. For example, many progressive lenses have narrow channels or vision zones, cause wearers to experience an unpleasant visual motion known as swim, and have large amounts of distortion (e.g., unwanted astigmatism) in the periphery of the lens.

Many prior art lens designs have attempted to improve upon the deficiencies of traditional multifocal lenses yet continue to suffer from significant drawbacks. FIG. 11 illustrates a front and side view of a prior art multifocal lens design described in U.S. Pat. No. 6,270,220 to Keren. Keren describes a multifocal lens having a progressive region 1104 and a diffractive segment 1102. The diffractive segment 1102 can be on the front or back surface of the multifocal lens. The multifocal lens is made up of a single material and comprises a single layer. The diffractive segment 1102 is limited to being positioned over the intermediate region of the progressive region 1104 only. The diffractive segment 1102 does not contribute optical power to the far distance or near distance vision zones of the multifocal lens. Instead, the diffractive segment 1102 contributes multiple different optical powers to the intermediate region only. The multiple different optical powers are not additive and can make the intermediate region uncomfortable to a wearer. Overall, the multifocal lens described in Keren provides only three vision zones with only two vision zones (the near vision and the distance vision zones) being stable.

FIG. 12 illustrates a front and side view of a prior art multifocal lens design described in U.S. Pat. No. 4,461,550 to Legendre. Legendre describes a multifocal lens having a progressive region 1202 and a refractive segment 1204 superposed in the near vision zone of the progressive region 1202. The refractive segment 1204 can be placed on top of the multifocal lens or can be positioned within the multifocal lens. The refractive segment 1204, when buried, does not form a separate layer of the multifocal lens. The refractive segment 1204 introduces a discontinuity 1206 around the near vision zone which can be very disturbing to a wearer. The refractive segment 1204 does not contribute to the optical power provided in the intermediate or far distance vision zones of the lens. Due to the increase in near vision power from the superposed refractive segment 1204, the power ramp up of the intermediate region of the progressive region 1202 must be increased significantly. As a result, unwanted astigmatism is increased in the lens thereby reducing the sizes of the vision zones. Further, the multifocal lens described in Legendre provides only three vision zones of which only two vision zones (the near vision and distance vision zones) are stable.

FIG. 13 illustrates a front and side view of a prior art lens design described in U.S. Pat. No. 5,305,028 to Okano. Okano describes a multifocal lens having a fused segment that has a first spherical segment 1302 and a second spherical segment 1306 joined by a progressive region 1304. The boundaries between the progressive region 1304 and the spherical regions 1302 and 1306 are transition regions 1308. These transition regions 1308 operate similarly to blend zones and therefore restrict the usefulness of the transition regions 1308 optically. The multifocal lens of Okano comprises a single material. Further, the multifocal lens of Okano comprises multiple discontinuities which can be very discomforting to a wearer of the lens when the wearer's line of sight traverses the provided vision zones. The near vision zone of the multifocal lens described by Okano comprises the spherical region 1306 only such that the progressive region 1304 does not contribute to the total near add power of the lens.

FIG. 14 illustrates a front and side view of a prior art lens design described in U.S. Pat. No. 6,086,203 to Blum et al. Blum et al. describes a multifocal lens having a progressive region 1404 and various discontinuous elements 1402. The progressive region 1404 is limited to being placed on a perform lens 1406. Further, the multifocal lens is limited to having two or more of the discontinuous optical elements 1402 added to the perform 1402. Blum et al. provides multiple vision zones but at the cost of introducing multiple discontinuities which results in significant discomfort for the wearer. Further, Blum et al. places the discontinuous elements below the start or top of the progressive region 1404. The discontinuities are therefore positioned in close proximity with one another which can exacerbate the discomfort of the wearer. As a result, the lens described by Blum is not viable for use when working on a computer.

Accordingly, what is needed is a lens that overcomes one or more deficiencies of prior art lenses. More specifically, a lens that provides multiple vision zones with low distortion and a minimum number of optical discontinuities while simultaneously remaining cosmetically pleasing is desired.

BRIEF DESCRIPTION OF THE DRAWINGS/FIGURES

FIG. 11 illustrates a front and side view of a prior art multifocal lens design.

FIG. 12 illustrates a front and side view of a prior art multifocal lens design.

FIG. 13 illustrates a front and side view of a prior art multifocal lens design.

FIG. 14 illustrates a front and side view of a prior art multifocal lens design.

DETAILED DESCRIPTION OF THE INVENTION

Aspects of the present invention provide multiple-layer (multi-layer) composite lenses comprising two or more materials and methods for making the same. A multi-layer composite lens of the present invention can use multiple surfaces (internal or external) to form optical elements that can contribute to a total desired add power. The multiple contributing optical elements can be aligned so as to be in optical communication to form multiple distinct and stable vision zones. Distributing the total desired add power across multiple appropriately aligned optical elements that are in optical communication with one another can reduce the total distortion of the lens, minimize the number of optical discontinuities introduced, can reduce optical power jump as experienced by the wearer's eye when traversing any discontinuity, and can reduce the visibility of any introduced optical discontinuity as perceived by an observer looking at the wearer.

Figure 1:
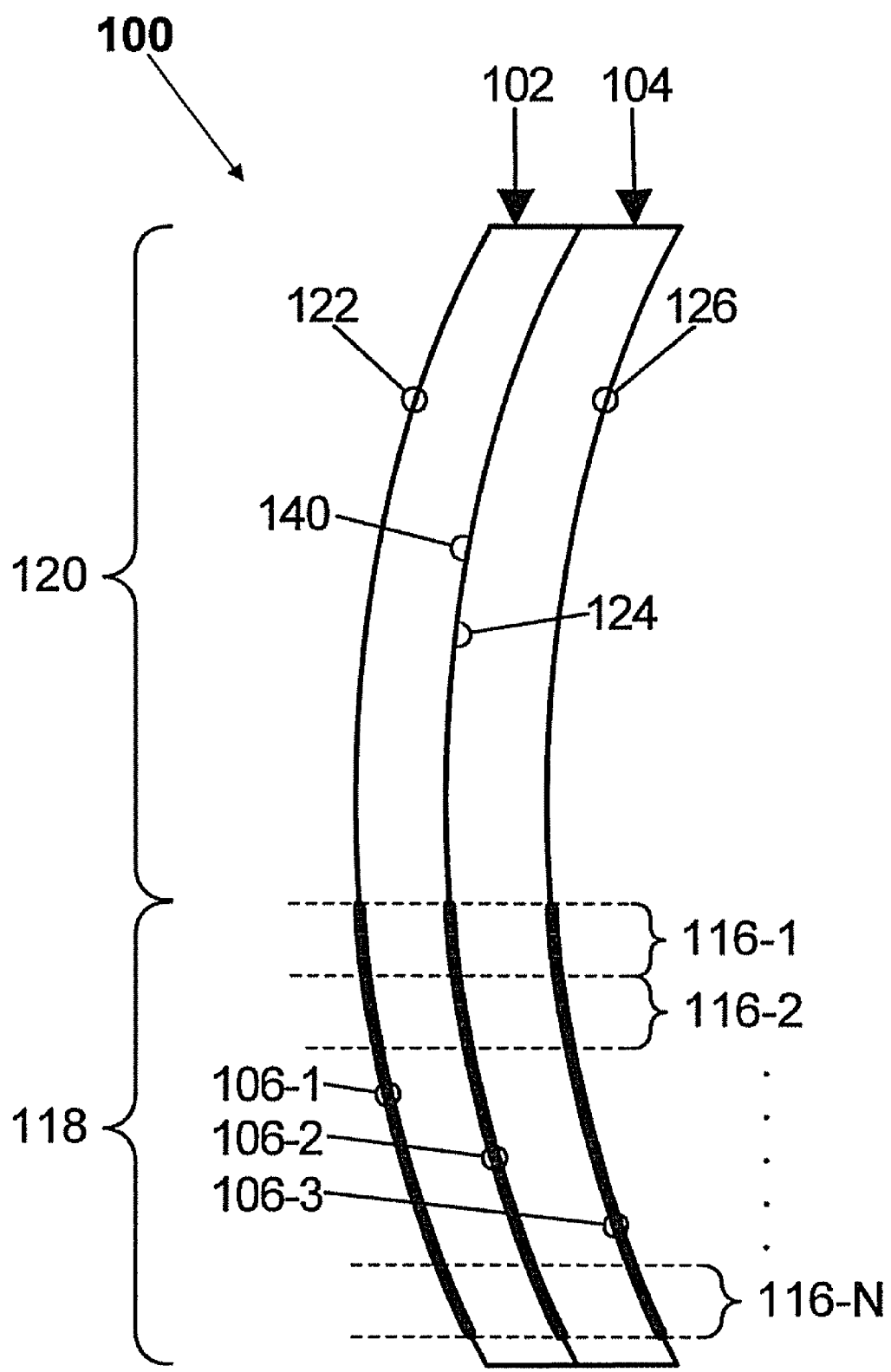
FIG. 1 illustrates a side view of a two-layer composite lens according to an aspect of the present invention.

FIG. 1 illustrates a side view of a two-layer composite lens 100 according to an aspect of the present invention. The two-layer composite lens 100 comprises a first layer 102 and a second layer 104. The first layer 102 can comprise a first material having a first index of refraction, $n_1$. The second layer 104 can comprise a second material having a second index of refraction, $n_2$. The first material and the second material can comprise different materials and can each be substantially homogeneous.

The first and second materials can be any materials such as, but not limited to, any plastic or glass. Depending upon the selection of the first and second materials, the first index of refraction, $n_1$, can be different from the second index of refraction, $n_2$. As shown in FIG. 1, the first layer 102 can form an anterior surface and the second layer 104 can form a posterior surface of the two-layer composite lens 100, such that the second layer 104 is intended to be located closer to a wearer's eye. In general, a surface of the two-layer composite lens 100 can be one or both of the external surfaces of the lens or an internal surface of the lens (not including any coatings such as, for example, hard coating).

An index matching layer can be positioned between the first layer 102 and the second layer 104. The index matching layer can also be considered to be an index mediating, mitigating or bridging layer. The index matching layer can be a thin layer of material having an index of refraction that is between the indices of refraction of the first and second layers 102 and 104 (e.g., an index of refraction approximately equal to the arithmetic mean of the indices of refraction of the first and second layers 102 and 104 or to within +/−0.02 of the arithmetic mean). Either layer can also be coated or covered by a scratch resistant and index matching layer. Such a coating can be dipped or spin-coated onto a layer and can cover the entirety of a layer.

The two-layer composite lens 100 can represent a finished lens, a finished lens blank, a semi-finished lens blank or a non-finished lens blank. More specifically, the two-layer composite lens 100 can be a finished lens (edged and ready to mount in a frame), a finished lens blank (finished on both outer surfaces but not yet edged), a semi-finished lens blank (finished on a first outer surface and not finished on a second outer surface) or a non-finished lens blank (having neither outer surface finished). The two-layer composite lens 100 can be subjected to any known lens treatments or coatings prior to forming a final ophthalmic lens as will be appreciated by one skilled in the pertinent art(s).

A final desired state, or a state prior to the final desired state, of any external or internal surface of the two-layer composite lens 100, or any portion thereof, can be shaped by one or more molds. The shaping of any external or internal surface of the two-layer composite lens 100, or any portion thereof, can be the result of a lens blank fabrication process. Any and all known lens blank fabrication processes can be used to shape any external or internal surface of the two-layer composite lens 100, or any portion thereof, to a final desired state or a state prior to a final desired state.

Any internal surface, or portion thereof, of the two-layer composite lens 100 can be shaped to a final desired state prior to positioning the first layer 102 and the second layer 104 as shown in FIG. 1. The final desired state of any internal or external surface of the two-layer composite lens 100, or any portion thereof, can be shaped by the result of one or more processes appreciated by one skilled in the pertinent art(s) including, but not limited to, stamping, thermoforming, molding, injection molding, free-forming, diamond turning, machining, and surfacing and polishing.

An upper portion or region 120 of the two-layer composite lens 100 can form a distance vision zone. The distance vision zone 120 can be considered a first vision zone of the two-layer composite lens 100.

A lower portion 118 of the two-layer composite lens 100 can comprise one or more enhanced optical regions 106. The optical regions 106 can be considered enhanced because they can have curvatures or structures, or can contribute to optical powers, that are different from corresponding portions of the upper region 120 of the two-layer composite lens. The enhanced optical regions can contribute to the additive power of the two-layer composite lens 100 provided in the lower region 118.

As shown in FIG. 1, the upper region 120 is positioned relative to the lower region 118. The upper portion 120 can be a portion of the two-layer composite lens 100 positioned approximately above a fitting point or a geometric center of the two-layer composite lens 100. The lower portion 118 can be a portion of the two-layer composite lens 100 positioned approximately below a fitting point or a geometric center of the two-layer composite lens 100.

As shown in FIG. 1, the two-layer composite lens 100 can comprise a first enhanced optical region 106-1, a second enhanced optical region 106-2 and a third enhanced optical region 106-3. The first enhanced optical region 106-1 can be positioned on an external surface 122 of the first layer 102 (e.g., a first external surface 122 of the two-layer composite lens 100).

The second enhanced optical region 106-2 can be positioned on a surface 140 of the first layer 102 (e.g., on a back surface 140 of the first layer 102). The surface 140 can be an internal surface or an unexposed surface 140 of the first layer 102. Alternatively, the second enhanced optical region 106-2 can be positioned on a surface 124 of the second layer 104 (e.g., on a front surface 124 of the second layer 104). The surface 124 can be an internal surface or an unexposed surface 124 of the second layer 104.

As shown in FIG. 1, the surface 140 of the first layer 102 and the surface 124 of the second layer 104 can form a boundary separating the first layer 102 and the second layer 104. The two-layer composite lens 100 can be fabricated such that the surface 140 substantially overlays or covers the surface 124 of the second layer 104, or any portion thereof. That is, the surfaces 140 and 124 can substantially complement one another such that no gap, void or space exists between the first layer 102 and the second layer 104.

The third enhanced optical region 106-3 can be positioned on an external finished surface of the second layer 104 (i.e., a second external surface 126 of the two-layer composite lens 100) when a curvature of the external surface is being finished. For purposes of illustration and clarity only, the first layer 102 and the second layer 104 are depicted as being of the same size or dimension but are not so limited. That is, the first layer 102 and the second layer 104 can each be of any size, height, width, thickness, shape and geometry. Further, the first layer 102 and the second layer 104 are not limited to extending across the entire vertical or horizontal dimensions of the two-layer composite lens 100. Any surface of either the first layer 102 or the second layer 104 can be free-formed in accordance with any desired features as will be appreciated by one skilled in the pertinent art(s).

The enhanced optical regions 106 are each depicted as having approximately the same vertical dimensions, lengths or sizes for purposes of illustration and clarity only and are not so limited. That is, the enhanced optical regions 106-1, 106-2 and 106-3 can each be of any height or size. Additionally, the enhanced optical regions 106 are depicted as being approximately horizontally aligned for purposes of illustration and clarity only and are not so limited. That is, the enhanced optical regions 106-1, 106-2 and 106-3 can be positioned along any respective vertical portion of the two-layer composite lens 100. More specifically, the enhanced optical region 106-1 can be vertically positioned along any portion of the first external surface 122; the enhanced optical region 106-2 can be vertically positioned along any portion of the internal surface 140 or the internal surface 124; and the enhanced optical region 106-3 can be vertically positioned along any portion of the second external surface 126. Overall, any enhanced optical region 106 can be of any vertical dimension (or any horizontal dimension though not depicted in FIG. 1). Further, none of the enhanced optical regions 106 are limited to being positioned in the lower portion 118 of the two-layer composite lens 100.

The enhanced optical regions 106 can be aligned such that light passing through more than one of the enhanced optical regions 106 can experience a combined optical power equal to the sum of the optical powers contributed by each individual enhanced optical region 106 through which the light passes. When any two of the enhanced optical regions 106, or any portions thereof, are so aligned, they can be considered to be in optical communication with one another.

The enhanced optical regions 106 can be aligned to form multiple vision zones 116-1 through 116-N. Vision zone 116-N can be a near vision zone and can provide a total near add power of the two-layer composite lens 100. Each of the other vision zones 116 can provide a portion of the total near add power of the two-layer composite lens 100.

An enhanced optical region 106 can contribute to a constant, substantially constant, or variable optical power or any combination thereof, including plano or zero optical power and negative optical power. An optical discontinuity can occur at a boundary, or any portion thereof, of an enhanced optical region 106. An optical discontinuity can occur within an enhanced optical region 106.

An optical discontinuity can be considered to be a change in optical power that causes most individuals to perceive an image break when the change in optical power is traversed by an individual's line of sight. The change in optical power can occur at a boundary between two optical regions of different optical power. In many instances, a change in optical power (e.g., a step up in optical power or a step down in optical power) of approximately 0.1 diopters (D) or greater can cause most individual to perceive an image break that can be considered to be caused by an optical discontinuity.

An enhanced optical region 106 can comprise a refractive structure, a diffractive structure, a variable power structure, or a progressive structure (e.g., a progressive refractive structure) or any combination thereof. Any enhanced optical region 106 can be blended at its boundary, or any portion thereof, or within any portion of the enhanced optical region 106. As a refractive structure, an enhanced optical region 106 can comprise a refractive curve that is spherical, substantially spherical, aspheric, or any combination thereof. As a progressive structure, an enhanced optical region 106 can comprise a progressive structure that is either cropped or not cropped. A cropped refractive progressive structure can be a progressive region that has a portion of any associated astigmatism regions removed. A cropped diffractive progressive structure can have a reduced size (e.g., by removing or not forming a portion of a concentric ring of a typical diffractive structure) while maintaining a desired shape and effective optical power.

Further, as will be appreciated by one skilled in the pertinent art(s), an enhanced optical region 106 as a progressive structure can comprise a region of continuously varying optical power ranging from a first optical power (e.g., a minimum optical power), typically in an upper portion of the progressive structure, to a second optical power (e.g., a maximum optical power), typically in a lower portion of the progressive structure. A progressive structure can be of a hard or soft design as will be appreciated by one skilled in the pertinent art(s). Additionally, a progressive structure can be a progressive optical power surface and can be diffractive or refractive.

As a progressive structure, an enhanced optical region 106 can be considered to begin or start when the optical power contributed by the progressive structure is increased above the optical power contributed by an adjacent region or vision zone (e.g., the distance vision zone) of the two-layer composite lens 100. Typically, this increase is a positive optical power of approximately +0.01 D or greater. The difference in optical power between a start of the progressive structure and the adjacent region or vision zone of the two-layer composite lens 100 can be formed by a mostly continuous increase in positive optical power (e.g., a slow ramp up in optical power).

Alternatively, the difference in optical power between a start of the progressive structure and the adjacent region or vision zone of the two-layer composite lens 100 can be caused by a step up in optical power which is either part of the progressive optical power region or part of a different optical power region. Such a step-up in optical power can form an optical discontinuity as previously described. Additionally, as will be appreciated by one skilled in the pertinent art(s), the optical power of the progressive structure can decrease after reaching its maximum optical power (e.g., prior to reaching the end or bottom of the progressive structure). In general, an enhanced optical region 106 as a progressive structure can be of any size or shape and can contribute to any substantially continuous change in optical power and therefore any optical power profile.

As previously mentioned, an optical discontinuity in a lens may result in a perceived image break when traversed by the line of sight of a wearer of the lens. Further, such an optical discontinuity may be visible to a person viewing the lens when the lens is being worn by a wearer. An example of a lens exhibiting this characteristic can be a traditional lined bifocal. In a traditional lined bifocal, a boundary separates a distance viewing zone and a near vision zone. This boundary is generally visible because of the large difference in the index of refraction between the material comprising the lens and the air surrounding or on top of the lens. This phenomenon can occur or can be found in many non-blended multifocal lenses that comprise one or more optical discontinuities.

An aspect of the present invention, in contrast to prior art lenses that contain multiple visible optical discontinuities, can reduce or remove the visibility of such an optical discontinuity as perceived by an observer of the lens. The visibility of an optical discontinuity can be reduced or removed entirely by positioning the optical discontinuity on a layer of material that is then covered by another layer of material having a similar index of refraction. Because the optical discontinuity is positioned behind another layer of material, and because the difference between the refractive indices of the two layers is less than the difference between the refractive indices of the layer containing the optical discontinuity and air, the visibility of the optical continuity can be reduced.

As an example, an optical discontinuity can be positioned on the front surface 124 of the second layer 104—e.g., by the boundary of the enhanced optical region 106-2. Because the first layer 102 has an index of refraction that is closer to the index of refraction of the second layer 104 as compared to air, the visibility of any optical discontinuity introduced by the enhanced optical region 106-2 can removed or reduced as compared to a lens not having a first layer 102. As such, an aspect of the present invention enables the two-layer composite lens 100 to provide many of the benefits of a lined bifocal or multifocal (e.g., multiple distinct vision zones 116) while improving the cosmetics or aesthetics of the two-layer composite lens 100 as compared to prior art lens systems.

A further aspect of the present invention includes the design of the shape and profile of an optical element that contributes to the total add power of lens such that the visibility of any discontinuity associated with the optical element is substantially reduced.

Further, it should be noted that any layer of the two-layer composite lens 100 can comprise one or more polarized layer or layers. Additionally, any layer of the two-layer composite lens 100 can be photochromic. For example, the first layer 102 can be photochromic. As another example, the second layer 104 can be photochromic and the first layer 102 can be formed to block or filter out as little Ultraviolet (UV) light as possible.

Figure 2:
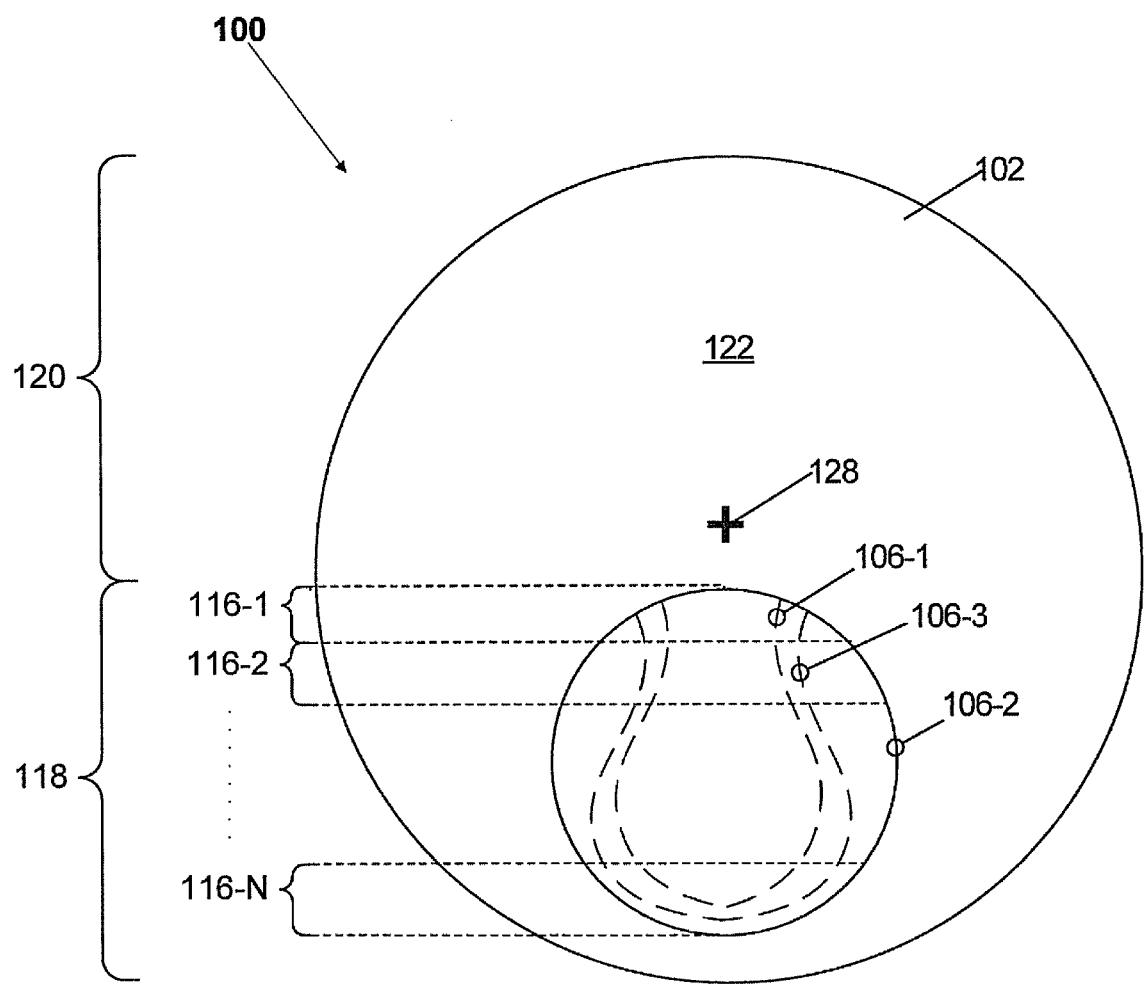
FIG. 2 illustrates a front view of the two-layer composite lens of FIG. 1 according to an aspect of the present invention.

FIG. 2 illustrates a front view of the two-layer composite lens 100 according to an aspect of the present invention. The front view of the two-layer composite lens 100 is a view directed at the front layer 102 of the two-layer composite lens 100. For purposes of illustration and clarity only, the enhanced optical region 106-1 is depicted as a first progressive surface, the enhanced optical region 106-2 is depicted as a round substantially spherical surface, and the enhanced optical region 106-3 is depicted as a second progressive surface. Accordingly, the enhanced optical region 106-2 can be a spherical surface, an aspheric surface or any combination thereof.

As shown in FIG. 2, the enhanced optical regions 106 can be positioned below a fitting point 128 of the two-layer composite lens 100 but are not so limited. That is, as previously described, the enhanced optical regions 106 can be positioned anywhere in the upper region 120 or the lower region 118 of the two-layer composite lens 100. Further, the fitting point 128 is shown as being positioned in the geometric center of the two-layer composite lens 100 for purposes of illustration and clarity only. In general, the fitting point 128 of the two-layer composite lens 100 can be positioned at any point relative to the geometric center of the two-layer composite lens 100. For example, the fitting point can represent the approximate location of a wearer's pupil when looking straight ahead through a lens once the lens is mounted in an eyeglass frame and positioned on the wearer's face. As further shown in FIG. 2, the enhanced optical regions 106 can be positioned to be horizontally centered with respect to the fitting point 128 (and with respect to each other) but are not so limited.

As progressive surfaces, the enhanced optical regions 106-1 and 106-3 can contribute to variable optical powers that each range from a first value (e.g., a minimum value) to a second value (e.g., a maximum value) with respect to a top and bottom of the respective enhanced optical regions 106-1 and 106-3. When combined with the constant optical power contributed by the enhanced optical power region 106-2, the enhanced optical regions 106 can form the vision zones 116-1 through 116-N. As previously described, the visibility of any optical discontinuity that may be formed at the boundary of the enhanced optical region 106-2 can be reduced or removed by positioning of the first layer 102 over the second layer 104.

As depicted in FIG. 2, the enhanced optical regions 106-1 and 106-3 are positioned within a boundary of the enhanced optical region 106-2 but are not so limited. That is, the enhanced optical regions 106 can be positioned such that the enhanced optical regions 106 fully or partially overlap one another as may be desired to form the vision zones 116. Further, the enhanced optical regions 106 can be of any shape. For example, the enhanced optical regions 106—e.g., as refractive segments—can be curved, elliptical, round, oval or can be of a flat-top design.

As used herein, refractive segments are not limited to fused, glued, adhered, or joined optical elements. Further, as used herein, refractive segments are not limited to optical elements that must extend across the entire surface of a lens. Instead, refractive segments as contemplated by the present invention can also include regions having an enhanced or different (e.g., additive) optical power relative to an adjacent region. Accordingly, a refractive segment can also be considered to be a portion of a lens surface having a curvature that is different from a remaining portion of the lens surface having a second, different curvature. Therefore, a refractive segment can comprise an additive power of a lens.

As shown in FIGS. 1 and 2, an aspect of the present invention enables multiple optical elements of the two-layer composite lens 100 to contribute to the total optical power provided by each vision zone 116. Further, an enhanced optical region 106, as a progressive structure, can enable the vision zones 116 to provide variable optical powers while minimizing the number of optical discontinuities introduced. Separating the total power required for a particular vision zone across two or more optical elements, with at least one optical element comprising a progressive structure, the two-layer composite lens 100 can still provide the same optical powers zones 116 with same desired optical powers as a prior art single layer progressive lens. However, the two-layer composite lens 100 can provide this substantially identical performance with less distortion than a traditional single layer progressive lens.

Specifically, the distortion introduced by a progressive structure can exceed the maximum optical power contributed by the progressive structure for high optical power values. For example, a progressive structure providing a maximum add power of 1.00 D may introduce only 1.00 D of unwanted astigmatism; however, a progressive structure providing a maximum add power of 2.00 D may introduce 2.25 D of unwanted astigmatism and a progressive structure providing a maximum add power of 3.00 D may introduce 3.75 D of unwanted astigmatism. As the maximum add power of a progressive structure is increased, the unwanted astigmatism introduced by the progressive structure can outpace the additive power. Therefore, in accordance with an aspect of the present invention, by reducing the optical power to be contributed by an enhanced optical region as a progressive structure 106, the total distortion introduced in the lens can be reduced. Further, if more than one enhanced optical region 106 is formed as a progressive structure, then the progressive structures can be aligned to cancel out or reduce a portion of the unwanted astigmatism.

Accordingly, an aspect of the present invention can provide the same or more vision zones with the same optical powers as a traditional multifocal lens while simultaneously reducing the total introduced distortion and improving the cosmetics of the lens. This improvement can be achieved without blending and with minimizing the number of introduced optical discontinuities.

Figure 3:
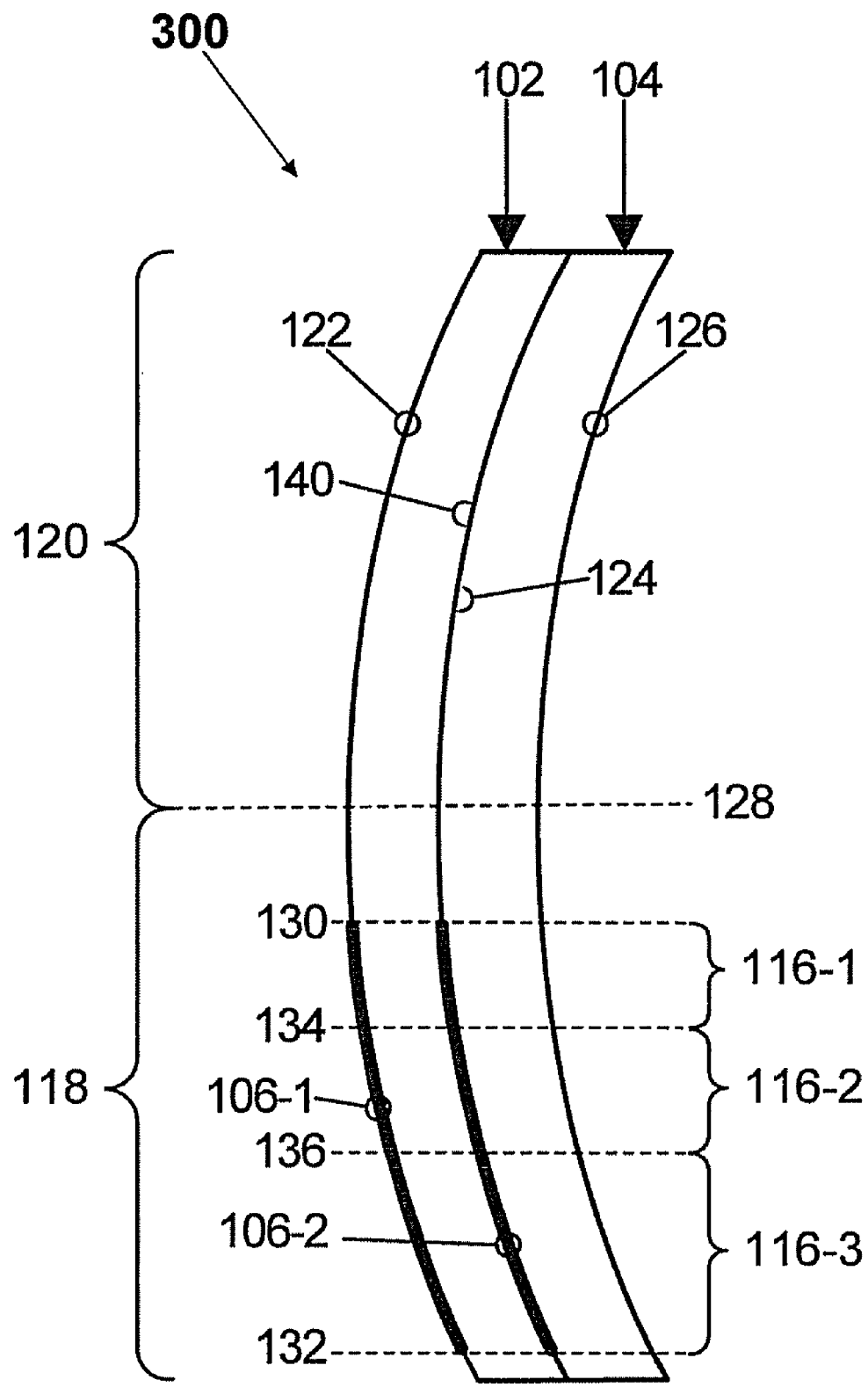
FIG. 3 illustrates a side view of an implementation of the two-layer composite lens of FIG. 1 according to an aspect of the present invention.

FIG. 3 illustrates a two-layer composite lens 300 according to an aspect of the present invention. The two-layer composite lens 300 can represent a particular implementation of the two-layer composite lens 100. The two-layer composite lens 300 can represent a finished lens, a finished lens blank, a semi-finished lens blank or a non-finished lens blank. More specifically, the two-layer composite lens 300 can be a finished lens (edged and ready to mount in a frame), a finished lens blank (finished on both outer surfaces but not yet edged), a semi-finished lens blank (finished on a first outer surface and not finished on a second outer surface) or a non-finished lens blank (having neither outer surface finished).

The two-layer composite lens 300 can comprise two enhanced optical regions 106-1 and 106-2. The second external surface 126 (or back surface 126) of the two-layer composite lens 300 can be shaped to a final desired state. For example, the surface 126 can comprise a refractive surface having a substantially constant radius of curvature in both the upper region 120 and the lower region 118. The surface 126 can also comprise a toric surface. The surface 126 can also be shaped to include a progressive surface or structure in addition to a spherical, aspherical or toric surface. In general, the back surface 126 can be shaped in accordance with a particular distance correction prescription.

The first external surface 122 (or front surface 122) in the upper region 120 can be shaped to a final desired state. For example, the surface 122 can comprise a refractive curve having a substantially constant radius of curvature. The internal surfaces 140 and 124 in the upper region 120 can also comprise a refractive curve having a substantially constant radius of curvature. The front surface 122 and the internal surfaces 140 and 124 can be substantially parallel such that the radius of curvature of the surfaces 140 and 124 match, parallel or follow the radius of curvature of the surface 122.

The curvature of the back surface 126 can contribute to the distance power of the two-layer composite lens 300. During a finishing process, the radius of curvature and/or toric surfaces of the back surface 126 (in both the upper region 120 and the lower region 118) can be set to be substantially equal to establish a desired optical power in the upper region 120. Accordingly, the set desired optical power in the upper region 120 can form a far distance vision zone 120 of the two-layer composite lens 300.

The enhanced optical region 106-1 can comprise a progressive addition surface. In particular, the enhanced optical region 106-1 can be a refractive progressive optical power structure. As such, the enhanced optical region 106-1 can contribute to a first progressive optical power ramp (i.e., change in optical power) between a start or top 130 of the enhanced optical region 106-1 and a first boundary 134 of the enhanced optical region 106-1. The enhanced optical region 106-1 can contribute to a second progressive optical power ramp between the first boundary 134 and a second boundary 136 of the enhanced optical region. The enhanced optical region 106-1 can contribute to a constant optical power between the second boundary 136 and a bottom or end 132 of the enhanced optical region 106-1.

The first progressive optical power ramp contributed by the enhanced optical region 106-1 can contribute to the total optical power provided within the vision zone 116-1. The second progressive optical power ramp contributed by the enhanced optical region 106-1 can contribute to the total optical power provided within the vision zone 116-2. The constant optical power contributed by the enhanced optical region 106-1 can contribute to the total optical power provided within the vision zone 116-3. The optical power contributed by the enhanced optical region 106-1 between the boundaries 130 and 136 can be a continuously increasing optical power that reaches a maximum at or near the boundary 136.

The enhanced optical region 106-2 can comprise a refractive surface having a substantially constant radius of curvature. Alternatively, the enhanced optical region 106-2 can comprise a refractive surface having a changing radius of curvature as found in an aspheric lens. The enhanced optical region 106-2 can be of any shape including, but not limited to, round, oval, elliptical or rectangular and can comprise a refractive surface that is spherical, substantially spherical, aspheric, or any combination thereof. The enhanced optical region 106-2 can contribute to an optical power that is substantially constant. The enhanced optical region 106-2 can be located on the interior surface 124 of the second layer 104 or the interior surface 140 of the first layer 102. Therefore, the interior surface 124 (and/or the interior surface 140) can comprise regions of at least two different curvatures—a first curvature in the upper portion 120 and a second curvature in the lower region 118 that forms the enhanced optical region 106-2.

The first curvature of the surface 124 of the second layer 104 can contribute to a first optical power (in the upper region 120) and the second curvature of the surface 124 can contribute to a second optical power (in the lower region 118. The second optical power can be considered to be an additive optical power with respect to the first optical power. The difference in the radii of curvatures between the first curvature and the second curvature can form an optical discontinuity. That is, a boundary, or any portion thereof, between the first curvature of the interior surface 124 and the second curvature of the enhanced optical element 106-2 can form an optical discontinuity. The surface 124 and the enhanced optical region 106-2 can be formed by way of any known manufacturing process including, but not limited to, casting, stamping, thermoforming, molding, free-forming, diamond turning, and machining.

The optical power of a refractive surface having a substantially constant radius of curvature can be determined using the lens maker's formula:

$$P = \frac{n_x - n_y}{r} \quad (1)$$

where $n_x$ represent the index of refraction of a material X immediately after the refractive surface with respect to the direction of light, $n_y$ represents the index of refraction of a material Y immediately prior to the refractive surface, and r represents the radius of curvature of the refractive surface between materials X and Y. Generally, for a radius of curvature expressed in units of meters (m), optical power is expressed in units of diopters ($m^{-1}$ or D). For the enhanced optical region 106-2, the optical power it contributes to is given by:

$$P = \frac{n_2 - n_1}{r_{124}} \quad (2)$$

where $r_{124}$ represents the radius of curvature of the surface 124. Accordingly, it can be seen from equation (4) that as the difference in the refractive indices between the first layer 102 and the second layer 104 increases, optical power increases for a given radius of curvature. Further, the difference between refractive indices between the first layer 102 and the second layer 104 can be any value such as, but not limited to, at least 0.01.

The two-layer composite lens 300 can be designed such that the first layer 102 and the second layer 104 are each either positive or negative lenses and/or provide positive or negative add powers. For some implementations of the two-layer composite lens 300, the materials selected for the first layer 102 and the second layer 104 can be such that $n_2 > n_1$. Under such a scenario, a spherical segment positioned on the second layer 104 can protrude outward, thereby increasing the thickness of the second layer 104. For other implementations of the two-layer composite lens 300, the materials selected from the first layer 102 and the second layer 104 can be such that $n_1 > n_2$. Under such a scenario, a spherical segment positioned on the second layer 104 can protrude inward, thereby decreasing the thickness of the second layer 104.

The enhanced optical region 106-2, as a substantially spherical segment, can contribute a constant optical power that is additive with respect to the upper region 120 of the two-layer composite lens 300. The substantially spherical segment 106-2 can comprise an aspheric region. For example, the substantially spherical segment 106-2 can comprise an aspheric region in the periphery of the substantially spherical segment 106-2 that can form a boundary or intermediate region surrounding the substantially spherical segment 106-2 or any portion thereof.

The substantially spherical segment can increase the thickness of the second layer 104 beyond an initial thickness contributed by a first curvature of the upper region 120 of the surface 124. Generally, as the width of the spherical segment is increased, the thickness contributed by the spherical segment will increase if the optical power of the spherical segment is to remain substantially the same. Alternatively, as the width of the spherical segment is increased, the thickness contributed by the spherical segment can be held constant but at the expense of decreasing optical power.

For some implementations of the two-layer composite lens 300, it may be desirable to maintain or increase the optical power contributed by the spherical segment so that the optical power required to be contributed by the enhanced optical region 106-1 can be kept low. Also, for some implementations of the two-layer composite lens 300, it may be desirable to maintain or increase the width of the spherical segment to increase its radius of curvature. By doing so, any optical discontinuity associated with the spherical segment can be pushed out into the peripheral nasal directions such that any optical discontinuity is less noticeable. However, the desire to increase the optical power and width of the spherical segment should be balanced against any increase in thickness contributed by the spherical segment as any such increase may increase the overall thickness of the two-layer composite lens 300.

Reducing the thickness of the two-layer composite lens 300 may be important for modifying the two-layer composite lens 300 to fit a particular eyeglass frame and/or to improve the cosmetics or aesthetics of the two-layer composite lens 300. As shown by equation (1), increasing the difference in the refractive index of the first layer 102 and the refractive index of the second layer 104 can increase the optical power contributed by the spherical segment 106-2. By increasing this difference in refractive index, the optical power contributed by the spherical segment 106-2 can be increased while maintaining the thickness contributed by the spherical segment 106-2. Overall, the refractive indices of the first layer 102 and the second layer 104, the width of the spherical segment 106-2, and the radius of curvature of the refractive curve can be varied to meet a variety of design constraints.

The enhanced optical region 106-2 can be considered to be a "buried segment" of the two-layer composite lens 300. That is, the front surface of the enhanced optical region 106-2 can be completely covered by another layer of material—specifically, the first layer of material 102. As a result, as previously discussed, the visibility of any optical discontinuity typically manifested as a lined discontinuity and introduced by a boundary of the enhanced optical region 106-2, can be greatly reduced, minimized or removed.

Further, as described above, the enhanced optical region 106-2 as a buried segment can contribute to one or more optical powers. As an example, the buried segment 106-2 can comprises one or more optical discontinuities (e.g., a lined multifocal design) separating or defining boundaries between different optical power zones. The visibility of any discontinuities positioned within the boundary of the buried segment 106-2—as seen by an observer looking at a wearer of the two-layer composite lens 300—can be reduced as a result of an aspect of the present invention as previously described. In a particular implementation, the buried segment 106-2 can have a round shape which can provide a significant reduction in the visibility of the buried segment 106-2 and a significant improvement in the overall aesthetics of the two-layer composite lens 300.

As shown in FIG. 3, the variable optical power contributed by the enhanced optical region 106-1 in conjunction with the constant optical power contributed by the enhanced optical region 106-2 can contribute to the formation of the three vision zones 116-1, 116-2 and 116-3 in the lower region 118 of the two-layer composite lens 300. The vertical sizes of the vision zones 116-1, 116-2 and 116-3 can be of any size such that any vision zone 116 can be of the same size or of a different size with respect to any other vision zone 116. The optical powers of the vision zones 116 can be adapted or customized for a particular wearer or application (e.g., for use as an occupational lens or computer lens). Further, the optical powers of the vision zones 116 can be any value and can be adjusted by adjusting the values of the optical powers contributed by the respective portions of the enhanced optical regions 106-1 and 106-2.

The first vision zone of the overall two-layer composite lens 300 can be the distance zone 120. The distance zone 120 can allow a wearer of the two-layer composite lens 300 to see an object clearly that is approximately 5 feet to approximately 20 feet or more from the wearer's eyes. The vision zones 116-1, 116-2 and 116-3 can comprise second, third and fourth vision zones, respectively, of the overall two-layer composite lens 300. The vision zones 116-1, 116-2 and 116-3 can be considered to be first, second and third vision zones within the lower region 118 of the two-layer composite lens 300 and may be referred to as such in the discussion herein for purposes of clarity only.

The vision zone 116-1 can be considered to be a far intermediate vision zone. Such a far intermediate vision zone 116-1 can provide, for example, a vision correction for viewing objects that are in range of approximately twenty-nine inches to approximately four feet to five feet from the eye of the wearer. As a further example, the far intermediate vision zone 116-1 can provide a vision correction for viewing objects that are in range of approximately twenty-nine inches to approximately ten feet from the eye of the wearer.

The third vision zone 116-2 can be considered to be an intermediate vision zone. Such an intermediate vision zone 116-2 can provide, for example, a vision correction for viewing objects that are in a range approximately twenty-nine inches to approximately eighteen inches from the eye of the wearer.

The vision zone 116-3 can be considered to be a near vision zone. Such a near vision zone 116-3 can provide, as an example, a vision correction for viewing objects that are in a range approximately eighteen inches to approximately ten inches from the eye of the wearer.

Overall, in combination with the distance vision zone 120, the two-layer composite lens 300 can provide four vision zones. One or more of the four vision zones can be stable in a horizontal and/or in a vertical direction. A stable vision zone can be any region having optical power that varies no more than 0.20 D per millimeter (mm)—for example, no more than 0.10 D/mm or nor more than 0.05 D/mm—across the region in a particular direction. Stable vision zones can also include regions having somewhat varying optical power across the region in particular direction but without introducing an optical discontinuity, swim or other distortion perceptible to a wearer. The sizes of the stable vision zones in both the vertical and horizontal directions can be designed to be of any shape and size.

In a particular implementation, the distance vision zone 120, the far-intermediate vision zone 116-1 and the near vision zone 116-3 can each be stable zones—either horizontally stable, vertically stable, or both—while the—intermediate vision zone 116-2 can be designed to not meet the aforementioned requirements of a stable zone. Further, according to an aspect of the present invention, based on the placement of an optical discontinuity associated with the enhanced optical region 106-2, the far-intermediate vision zone 116-1 can be perceived by a wearer of the lens as being continuous with the intermediate zone 116-2 and discontinuous with the far distance zone 120. Alternatively, the far-intermediate vision zone 116-1 can be perceived by a wearer of the lens as being discontinuous with the intermediate zone 116-2 and discontinuous with the far distance zone 120.

The two-layer composite lens 300 can provide these four vision zones, in a particular implementation, with as few as one optical discontinuity. As discussed above, the visibility of this single optical discontinuity, as observed by an individual looking at a wearer of the two-layer composite lens 300, can be significantly reduced or removed. Further, the enhanced optical region 106-1 as a refractive progressive optical power structure can be positioned or shaped to push any unwanted astigmatism (or at least an area of high unwanted astigmatism) off to the periphery of the two-layer composite lens 300.

Based on the positioning of the refractive progressive optical power structure 106-1, a portion of any introduced unwanted astigmatism can be pushed to the bottom or below the distance vision zone 120. Additionally, the enhanced optical region 106-2 can be made wider to further push into the periphery of the wearer's visual field the optical discontinuity as seen by the wearer when looking through the two-layer composite lens 300. By doing so, distortion introduced by the enhanced optical region 106-1 can be located off to the sides of a wearer's typical line of vision such that the distortion is less disturbing or noticeable to a wearer.

Each vision zone 116-1, 116-2 and 116-3 provides an additive power with respect to the optical power provided by the distance vision zone 120. The additive power of any vision zone 116 is determined by the summation of the individual additive powers contributed by the corresponding portions of the enhanced optical regions 106-1 and 106-2. Specifically, the additive optical power provided by the vision zone 116-1 is determined by the optical power contributed by the refractive progressive optical power structure 106-1 in combination with the optical power contributed by the substantially spherical segment 106-2 within the boundaries 130 and 134 (the additive optical powers of the first layer 102 and the second layer 104 between the boundaries 130 and 134); the additive optical power provided by the vision zone 116-2 is determined by the optical power contributed by the refractive progressive optical power structure 106-1 in combination with the optical power contributed by the substantially spherical segment 106-2 within the boundaries 134 and 136 (the additive optical powers of the first layer 102 and the second layer 104 between the boundaries 134 and 136); and the additive optical power provided by the vision zone 116-3 is determined by the optical power contributed by the refractive progressive optical power structure 106-1 in combination with the optical power contributed by the substantially spherical segment 106-2 within the boundaries 136 and 132 (the additive optical powers of the first layer 102 and the second layer 104 between the boundaries 136 and 132).

According to this partitioning of the additive powers of the two-layer lens 300 between separate additive optical powers contributed by the first layer 102 and the second layer 104, the optical powers contributed by the enhanced optical regions 106-1 and 106-2 provide the total or full near add power of the two-layer composite lens 300. In essence, the total near add power of the two-layer composite lens 300 is provided by a first component—the enhanced optical region 106-1 as a refractive progressive optical power structure—and a second component—the enhanced optical region 106-2 as a substantially spherical constant refractive optical power structure. Therefore, the optical power contribution of the enhanced optical region 106-1 can be considered to be a first incremental add power and the optical power contribution of the enhanced optical region 106-2 can be considered to be a second incremental add power. Therefore, in general, the enhanced optical region 106-1 can be considered to be a first incremental add power region (or zone) and the enhanced optical region 106-2 can be considered a second incremental add power region (or zone). Any additional enhanced optical regions can provide additional portions of the total add power of a lens of the present invention.

Together, the first and second incremental add powers provide the full or total add power of the lens desired for near distance vision as found in optical region 116-3. Since the enhanced optical region 106-1 contributes to an increasing progression of optical power between boundaries 130 and 136, the region between the boundaries 130 and 134 can provide an optical power that is a portion of the first incremental add power contributed by the enhanced optical region 106-1 in a region between the boundaries 136 and 132. Likewise, the region between boundaries 134 and 136 can provide an optical power that is a portion of the first incremental add power contributed by the enhanced optical region 106-1 in a region between the boundaries 136 and 132.

The contribution of the first incremental add power—and likewise the contribution of the second incremental add power—can be any fractional split of the total add power of the two-layer composite lens 300 provided in the near vision zone 116-3. As an example, the first incremental add power can be two-thirds or approximately 67% of the total add power of the two-layer composite lens 300. Under this scenario, the second incremental add power can provide the remainder or balance of the total add power or one-third or approximately 33% of the total add power of the two-layer composite lens 300.

In general, the first and second incremental add powers can take on any values such that together they sum to a total desired add power for a particular wearer. That is, the first incremental add power (or maximum optical power contributed by the enhanced optical region 106-1) can be any fraction or percentage of the total desired add power. Consequently, the second incremental add power (or the optical power contributed by the enhanced optical region 106-2) can be any complementing fraction or percentage of the total desired add power given the value of the first incremental add power. As an example, the enhanced optical region 106-1 can contribute to a first incremental add power that is 20%-80% of a total desired add power.

The optical powers provided in the far-intermediate vision zone 116-1 and the intermediate vision zone 116-2 can be any respective percentages of the total near add power provided by the near vision zone 116-3. For example, the far-intermediate vision zone 116-1 can provide an optical power that is approximately 20% to 44% of the total add power of the two-layer composite lens 300. Also as an example, the intermediate vision zone 116-2 can provide an optical power that is approximately 45% to 55% of the total add power of the two-layer composite lens 300.

In general, the portions of the enhanced optical regions 106-1 and 106-2 of the far-intermediate vision zone 116-1 and the portions of the enhanced optical regions 106-1 and 106-2 of the intermediate vision zone 116-2 and the portions of the enhanced optical regions 106-1 and 106-2 of the near vision zone 116-3 can contribute to optical powers that are any percentage or fraction of the total near add power of the two-layer composite lens 300. Further, the range of optical powers contributed by the enhanced optical region 106-1 (e.g., the power profile of the enhanced optical region 106-1) can be varied in accordance with any desired optical power to be provided by the far-intermediate vision zone 116-1 and the intermediate vision zone 116-2.

The two-layer composite lens 300, having the first enhanced optical region as a refractive progressive optical power structure and the second enhanced optical region as a refractive substantially spherical incremental add power segment can be considered to be a refractive-refractive two-layer composite multifocal lens. As described herein, the first and second incremental add power regions can be positioned on different surfaces—i.e., on different surfaces or surfaces that are separated with respect to one another by a thickness—yet still provide vision zones that are perceived by a wearer of the lens as continuous.

For example, the additive powers provided by the intermediate vision zone 116-2 and the near vision zone 116-3 of the two-layer composite lens 300 are provided by the first and second incremental add power regions 106-1 and 106-2. The first and second incremental add power regions 106-1 and 106-2 are located on separate surfaces of the two-layer composite lens 300. Therefore, the first and second incremental add power regions 106-1 and 106-2 are discontinuous with respect to one another. However, to a wearer of the two-layer composite lens 300, the intermediate vision zone 116-2 and the near vision zone 116-3 appear to be continuous.

As previously described, an aspect of the present invention enables the two-layer composite lens 300 to provide at least three stable vision zones with only one optical discontinuity (with at least two stable vision zones located below the fitting point 128 and a third stable vision zone above the only one optical discontinuity—e.g., the distance zone 120). Further, an aspect of the present invention enables the two-layer composite lens 300 to introduce less distortion than a traditional multifocal lens or progressive addition lens having the same total near add power. More specifically, providing substantially the same add power in a single layer progressive addition lens requires that more distortion (e.g., unwanted astigmatism) be introduced. By spreading a desired add power over multiple optical elements, the two-layer composite lens 300 reduces the distortion contribution from the enhanced optical region 106-1 as a refractive progressive optical power structure while providing a desired number of vision zones 120 and 116 with desired associated optical powers.

Figure 4A:
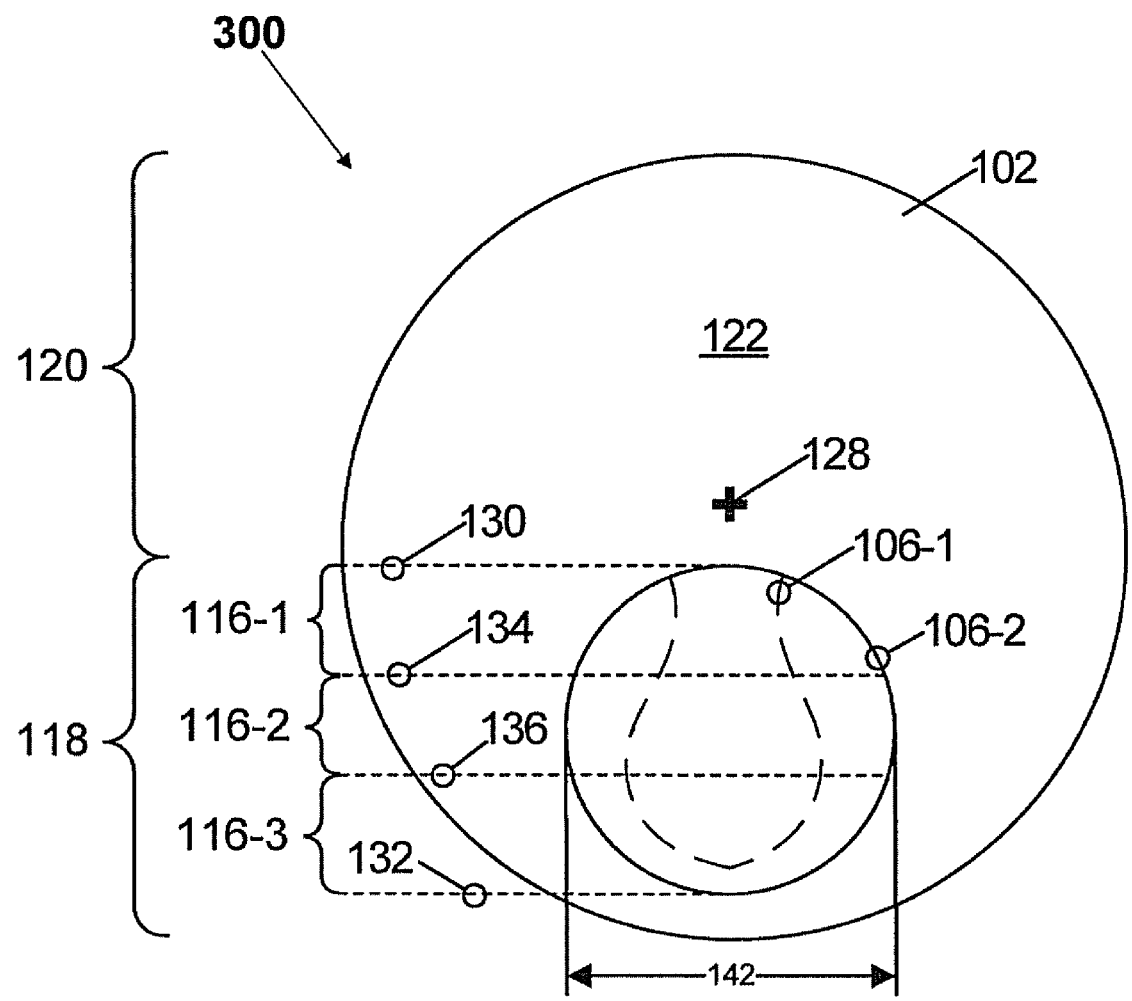
FIG. 4A illustrates a front view of the two-layer composite lens of FIG. 3 according to an aspect of the present invention.

FIG. 4A illustrates a front view of the two-layer composite lens 300 according to an aspect of the present invention. The front view of the two-layer composite lens 300 is a view directed at the front layer 102 of the two-layer composite lens 300. As shown in FIG. 2, the enhanced optical regions 106-1 and 106-2 are positioned below the fitting point 128 of the two-layer composite lens 300. The fitting point 128 can be located at a geometric center of the two-layer composite lens 300 but is not so limited (e.g., the fitting point can be a reference point on a lens that represents the approximate location of a wearer's pupil when looking straight ahead through the lens once the lens is mounted in an eyeglass frame and positioned on the wearer's face). Further, the fitting point 128 can be offset to the left or right of the geometric center of the two-layer composite lens 300. The fitting point 128 can also be offset above or below the geometric center of the two-layer composite lens 300. The enhanced optical regions 106-1 and 106-2 can be horizontally aligned with the fitting point 128. The tops of the enhanced optical regions 106-1 and 106-2 can be aligned vertically but are not so limited. Rather, the tops can begin at any distance below the fitting point 128 such as, for example, 4 mm.

The positioning and alignment of the enhanced optical regions 106-1 and 106-2 as depicted in FIG. 4 results in an improved visual experience by a wearer of the two-layer composite lens 300. Specifically, the location of any discontinuity introduced at a top boundary of the enhanced optical region 106-2 will not be too low below the fitting point as to be overly disturbing to a wearer of the two-layer composite lens 300. Specifically, if such a discontinuity were positioned too low below the fitting point, then the discontinuity could greatly interfere with a user's comfort when working on a computer screen since the discontinuity could cut across the computer screen and be seen and be perceived by the wearer as that of an aggravating image break. Further, if the discontinuity is located too close to the fitting point 128 then the discontinuity could be perceived as a disturbing image break in the line of sight of the wearer when the wearer looks straight ahead.

The enhanced optical region 106-2 can be substantially round in shape and can have a have a diameter 142. The diameter 142 of the enhanced optical region 106-2 can be any value such as, but not limited to, greater than 22 mm (e.g., 25 mm or larger—28 mm, 30 mm, 35 mm, 40 mm or larger). The enhanced optical region 106-1 can be positioned entirely within the boundary of the enhanced optical region 106-2. Alternatively, any portion of the enhanced optical region 106-1 can overlap any portion of the enhanced optical region 106-2 (i.e., the enhanced optical region 106-1 can begin above or below a top of the enhanced optical region 106-2). As such, any portion of the enhanced optical region 106-1 can extend beyond any portion of the boundary of the enhanced optical region 106-2.

Figure 4B:
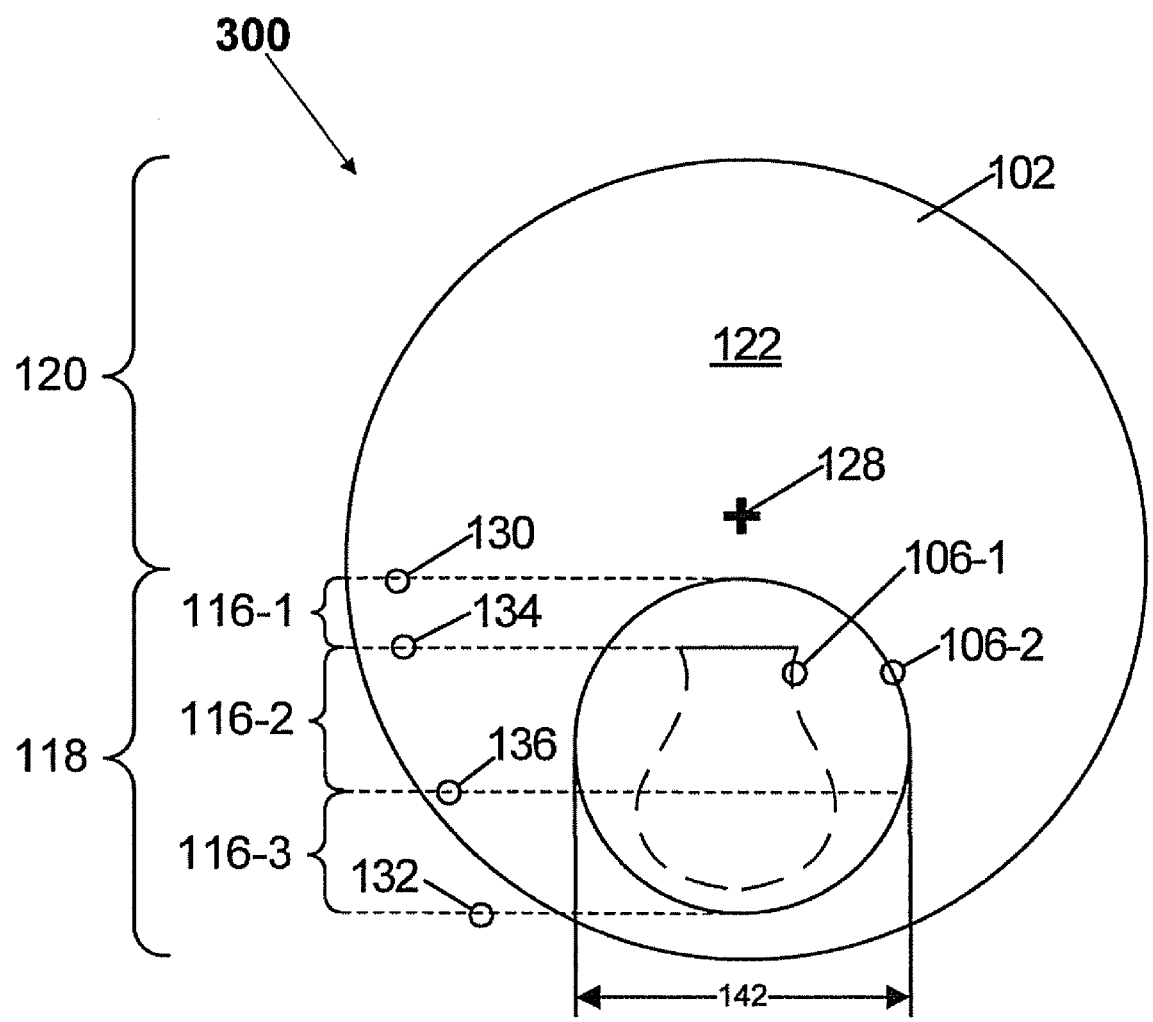
FIG. 4B illustrates a front view of a two-layer composite lens according to an aspect of the present invention.
Figure 4C:
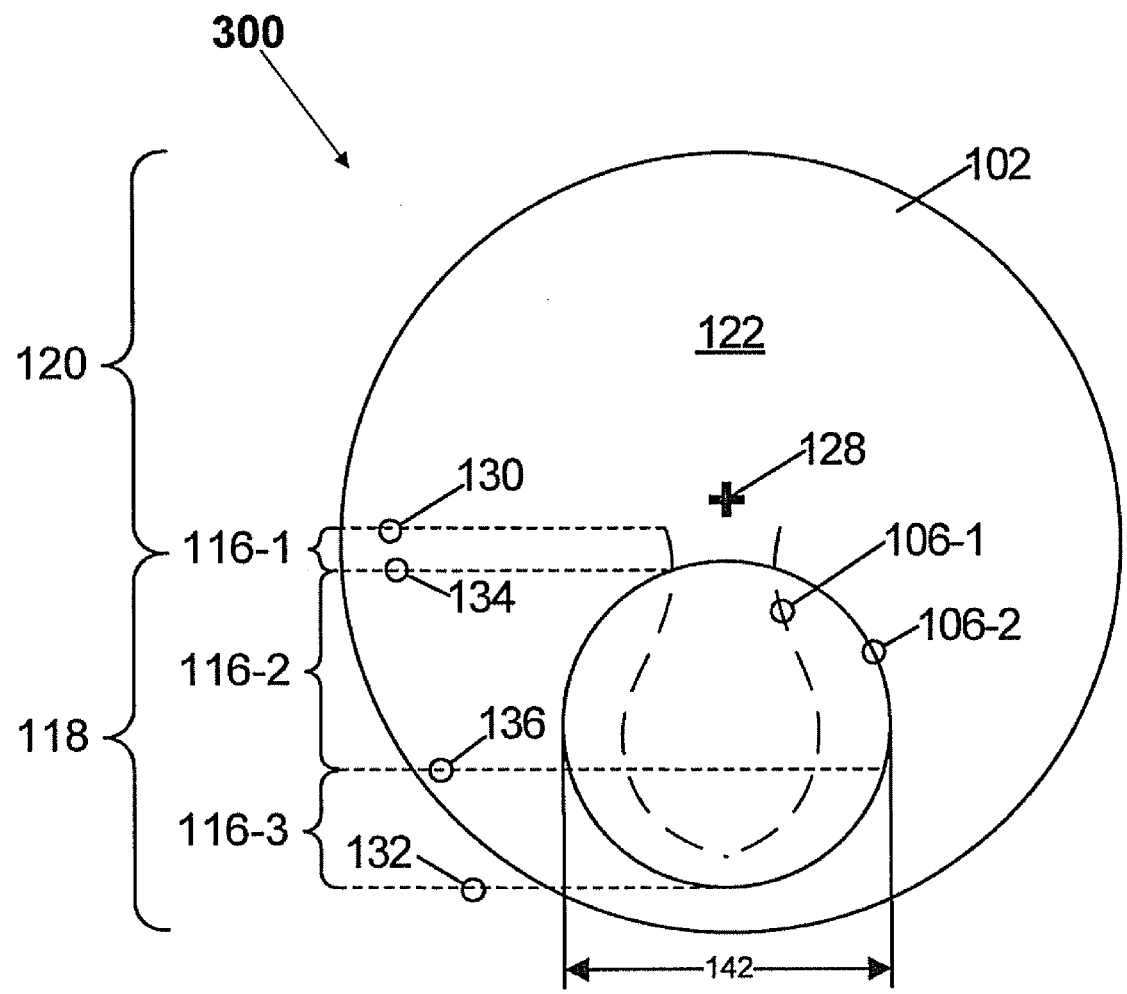
FIG. 4C illustrates a front view of a two-layer composite lens according to an aspect of the present invention.
Figure 5:
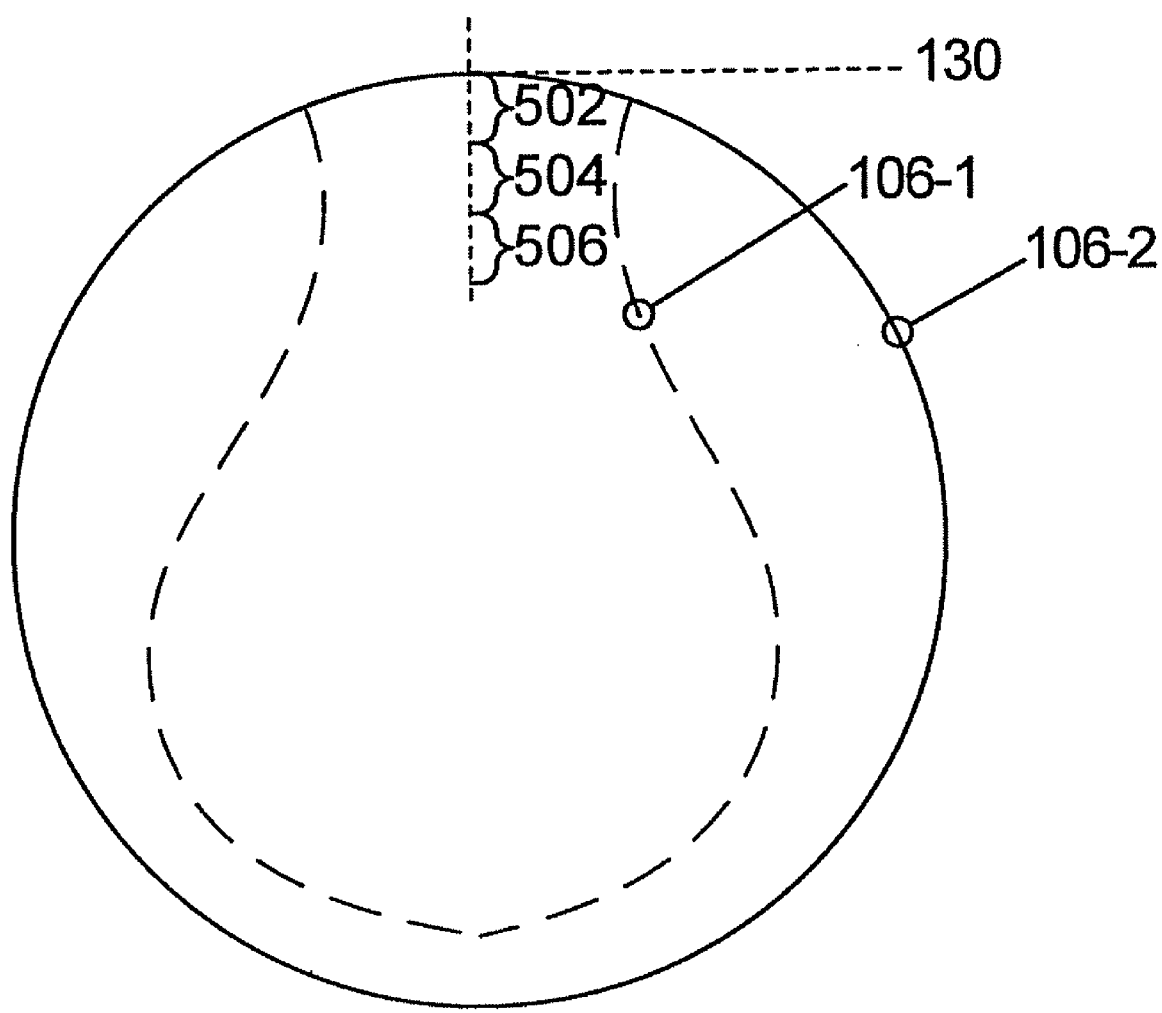
FIG. 5 illustrates a close-up view of enhanced optical regions depicted in FIG. 4A in accordance with an aspect of the present invention.

FIG. 5 illustrates a close-up view of the alignment and positioning of the enhanced optical regions 106-1 and 106-2 shown in FIG. 4. Specifically, FIG. 5 depicts a possible overlap between the upper portions of the enhanced optical region 106-1 and the enhanced optical region 106-2. As shown in FIG. 5, the top 130 of the enhanced optical region 106-1 is aligned with the top of the enhanced optical region 106-2. A first distance 502 can correspond to a first change in the optical power provided by the enhanced optical region 106-1. Specifically, the first change can be from a beginning optical power value (e.g., zero D) to a first optical power value. A second distance 504 can correspond to a second change in the optical power provided by the enhanced optical region 106-1. Specifically, the second change can be from the first optical power value to a second optical power value. A third distance 506 can correspond to a third change in the optical power provided by the enhanced optical region 106-1. Specifically, the change can be from a second optical power value to a third optical power. Accordingly, as shown in FIG. 5, the enhanced optical region 106-1 can change from a starting optical power at the top 130 of the enhanced optical power region 106-1 to a third optical power value by the end of a third distance 506.

The end of the third distance 506 can correspond to the boundary 134. In this way, the distance between the boundary 130 and the end of the third distance 506 can correspond to the far-intermediate vision zone 116-1.

The length of the first, second and third distances 502, 504 and 506, as well as the corresponding first, second and third optical power values can be adjusted and modified to accommodate any ramp-up in optical power within the enhanced optical region 106-1. For a sharp ramp up in optical power, the distances 502, 504 and 506 can be designed to be short and/or the power changes within each zone can be high. For a slow ramp up in optical power, the distances 502, 504 and 506 can be designed to be extended and/or the power changes within each zone can be low. In general, the distances 502, 504 and 506 and corresponding power change values can be designed to be any value.

As an example, each of the distances 502, 504 and 506 can be 1 mm in length and the changes in optical power can be +0.03 D in the first distance 502, +0.03 D in the second distance 504, and +0.04 D in the third distance 506. Under this scenario, the total optical power of the first distance 502 is +0.03 D, the total optical power of the second distance 504 is +0.06 D, and the total optical power of the third distance 506 is +0.1D. This enables the distance between the boundary 130 and the end of the third distance 506 to be a stable vision zone that can form the far-intermediate vision zone 116-1 of the two-layer composite lens 300.

Figure 6A:
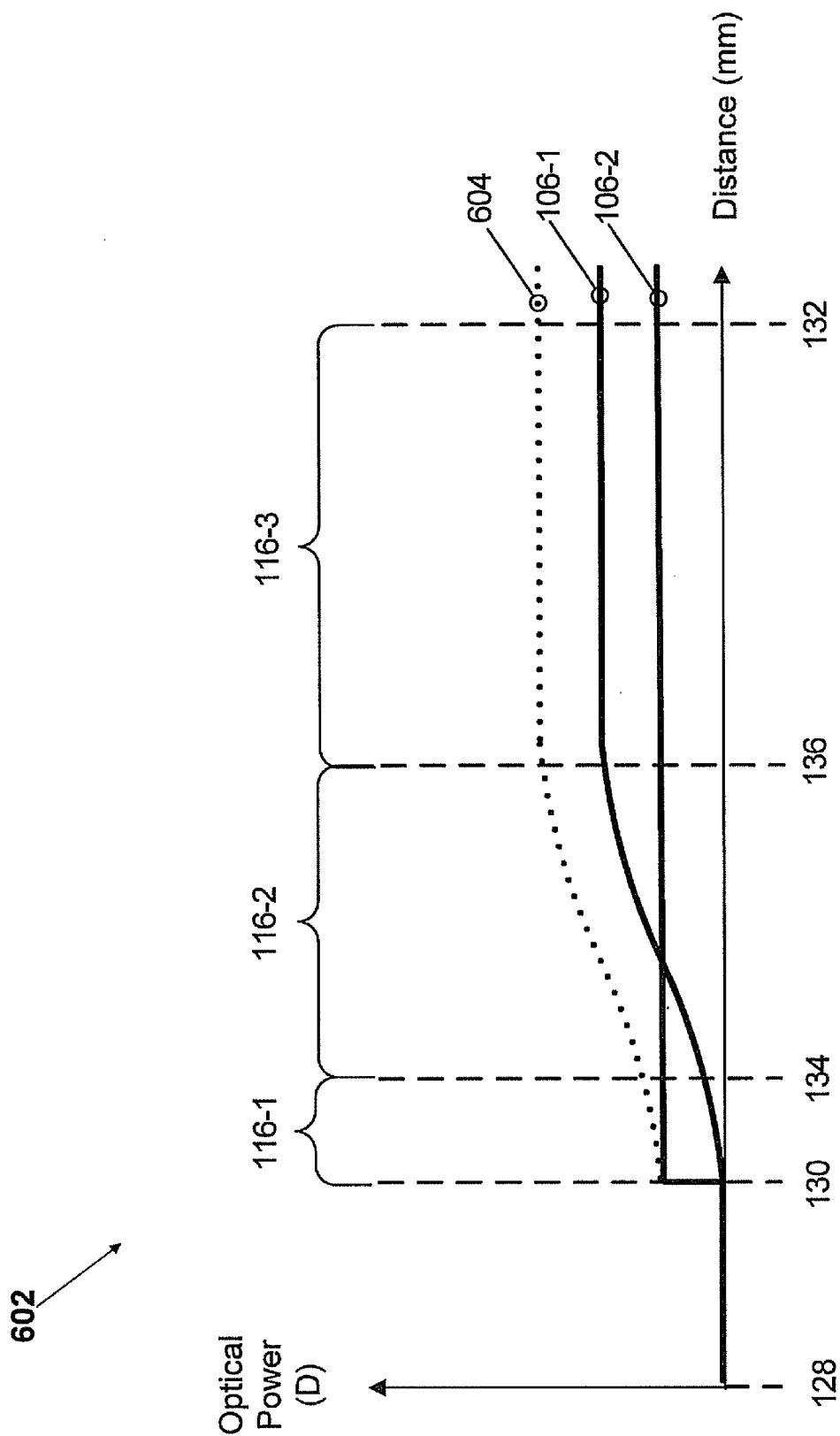
FIG. 6A illustrates an optical power profile of the two-layer composite lens depicted in FIG. 4A.

FIG. 6A illustrates a possible optical power profile 602 of the multi-layer composite lens 300. Specifically, FIG. 6A depicts an optical power profile resulting from the alignment shown in FIGS. 3 and 4A between the spherical incremental add power segment 106-2 and the progressive optical power region 106-1. As shown in FIG. 6A, the constant optical power contributed in part by the spherical incremental add power segment 106-2 begins at approximately the boundary 130. The boundary 130 can be positioned below the fitting point 128 of the two-layer composite lens 300. As an example, the boundary 130 can be posited approximately 4 mm below the fitting point 128. The positioning of the spherical incremental add power segment 106-2 at the boundary 130 can introduce a discontinuity at the boundary 130. Overall, the boundary 130 can be positioned between 1 mm and 10 mm below the fitting point 128.

The optical power contributed in part by the spherical incremental add power segment 106-2 (when substantially spherical) can be substantially constant across the vision zones 116-1, 116-2 and 116-3. Further, the optical power contributed in part by the progressive optical power region 106-1 can begin at approximately the boundary 130. Accordingly, between the fitting point 128 and the boundary 130, approximately 0 D of additive optical power can be provided by the two-layer composite lens 300. The distance viewing zone 120 of the two-layer composite lens 300 can therefore extend below the fitting point 128 of the two-layer composite lens 300.

Between the boundary 130 and 134, the progressive optical power region 106-1 can have a slow ramp up of optical power. Specifically, the progressive optical power region 106-1 can increase from approximately 0 D of optical power to approximately 0.1 D of optical power at the boundary 134 in accordance with the power ramp described above in relation to FIG. 5. The distance between the boundary 130 and the boundary 134 can be, for example, approximately 3 mm. In general, the distance between the boundary 130 and the boundary 134 can be between 1 mm to 10 mm.

Between the boundary 134 and 136, the progressive optical power region 106-1 can have a sharper ramp up in optical power. Specifically, the progressive optical power region 106-1 can increase from approximately 0.1 D of optical power at approximately the boundary 134 to its approximately maximum optical power at approximately the boundary 136. As mentioned previously, the maximum optical power contributed by the progressive optical power region 106-1 can be considered to be the first incremental add power of the two-layer composite lens 300. The distance between the boundary 134 and the boundary 136 can be, for example, approximately 9 mm. In general, the distance between the boundary 134 and the boundary 136 can be between 3 mm and 15 mm. The progressive optical power region 106-1 can contribute to a substantially constant optical power between the boundary 136 and the boundary 132.

The distance between the boundary 136 and the boundary 132 can be designed to be any desired distance. Further, the progressive optical power region 106-1 can provide a decrease in optical power at or near the boundary 132 if desired.

As shown in FIG. 6A and as an example only, the optical power contributed in part by the spherical incremental add power segment 106-2 is approximately one-third of the total incremental add power provided by the two-layer composite lens 300. Consequently, the optical power contributed in part by the progressive optical power region 106-1 can be approximately two-thirds of the total incremental add power provided by the two-layer composite lens 300. The profile curve 604 represents the overall optical power profile resulting from the spherical incremental add power segment 106-2 being in optical communication with the progressive optical power region 106-1 as described above in relation to FIG. 4A.

The incremental add powers contributed in part by the spherical incremental add power region 106-2 and the progressive addition optical power region 106-2 can form two stable vision zones—vision zones 116-1 and 116-3—and one non-stable vision zone 116-2 as described above.

FIG. 4B illustrates an alternative alignment of the spherical incremental add power region 106-2 and the progressive addition optical power region 106-2. Specifically, FIG. 4B depicts the progressive additional optical power region 106-2 starting or beginning approximately 3 mm below a top or start of the spherical incremental add power segment 106-1 which can begin approximately 4 mm below the fitting point 128. This possible alignment of the spherical incremental add power region 106-2 and the progressive additional optical power region 106-2 can also provide two stable vision zones—vision zones 116-1 and 116-3. Vision zone 116-2 can have any height defined by the distance between the boundaries 134 and 136 such as, for example, 9 mm.

Figure 6B:
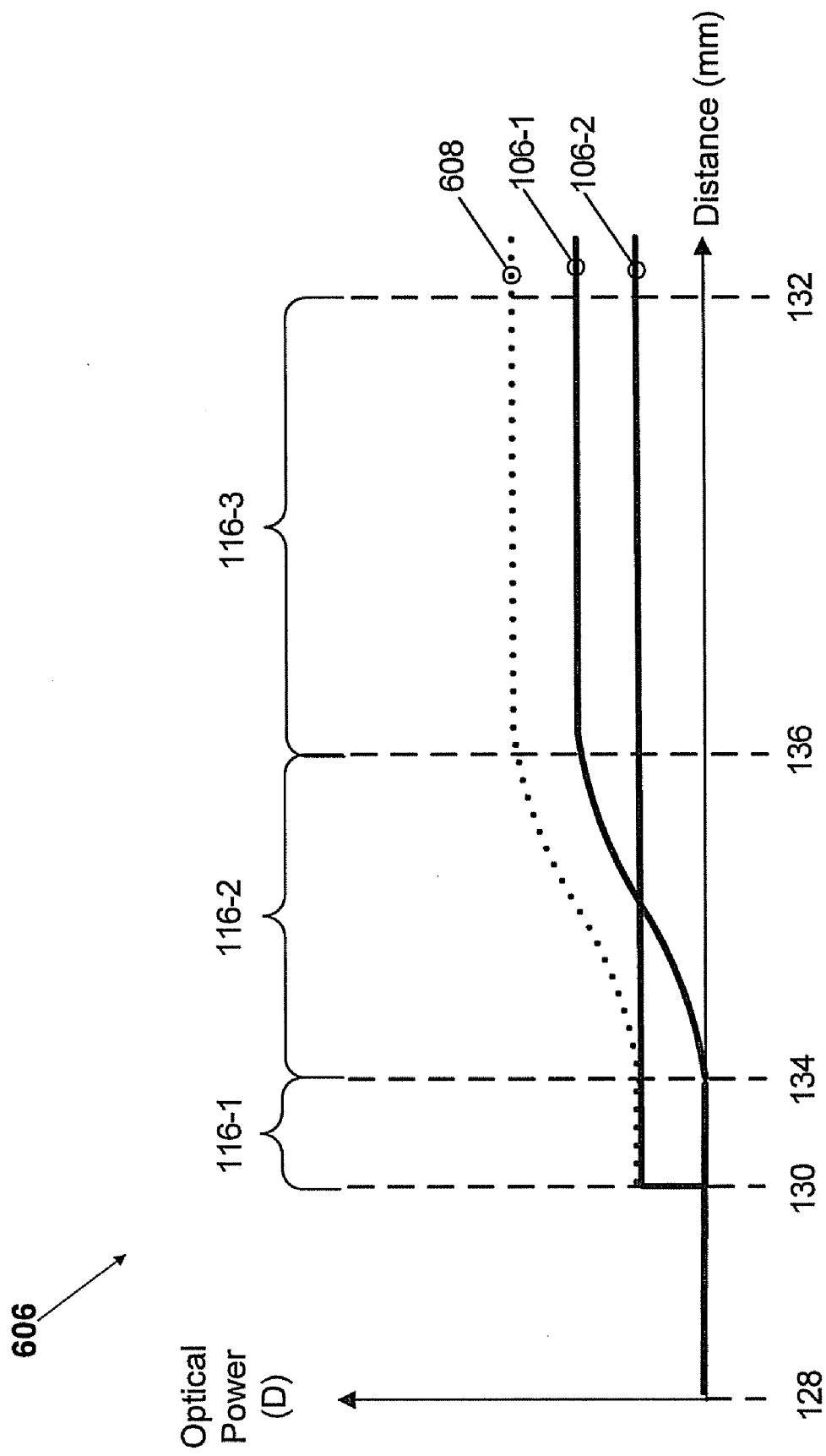
FIG. 6B illustrates an optical power profile of the two-layer composite lens depicted in FIG. 4B.

FIG. 6B illustrates a possible optical power profile 606 of the multi-layer composite lens 300 as depicted in FIG. 4B. As shown, the optical power provided by the vision zone 116-1 is contributed by the spherical incremental add power segment 106-2 alone as the optical power contributed in part by the progressive optical power region 106-1 does not begin until approximately the boundary 134. The optical power contributed by the progressive optical power region 106-1 can be a sharp ramp up between the boundaries 134 and 136. The optical power contributed by the spherical incremental add power segment 106-2 can form a discontinuity at approximately the boundary 130. The profile curve 608 represents the overall optical power profile resulting from the spherical incremental add power segment 106-2 being in optical communication with the progressive optical power region 106-1 as described above in relation to FIG. 4B.

Figure 6C:
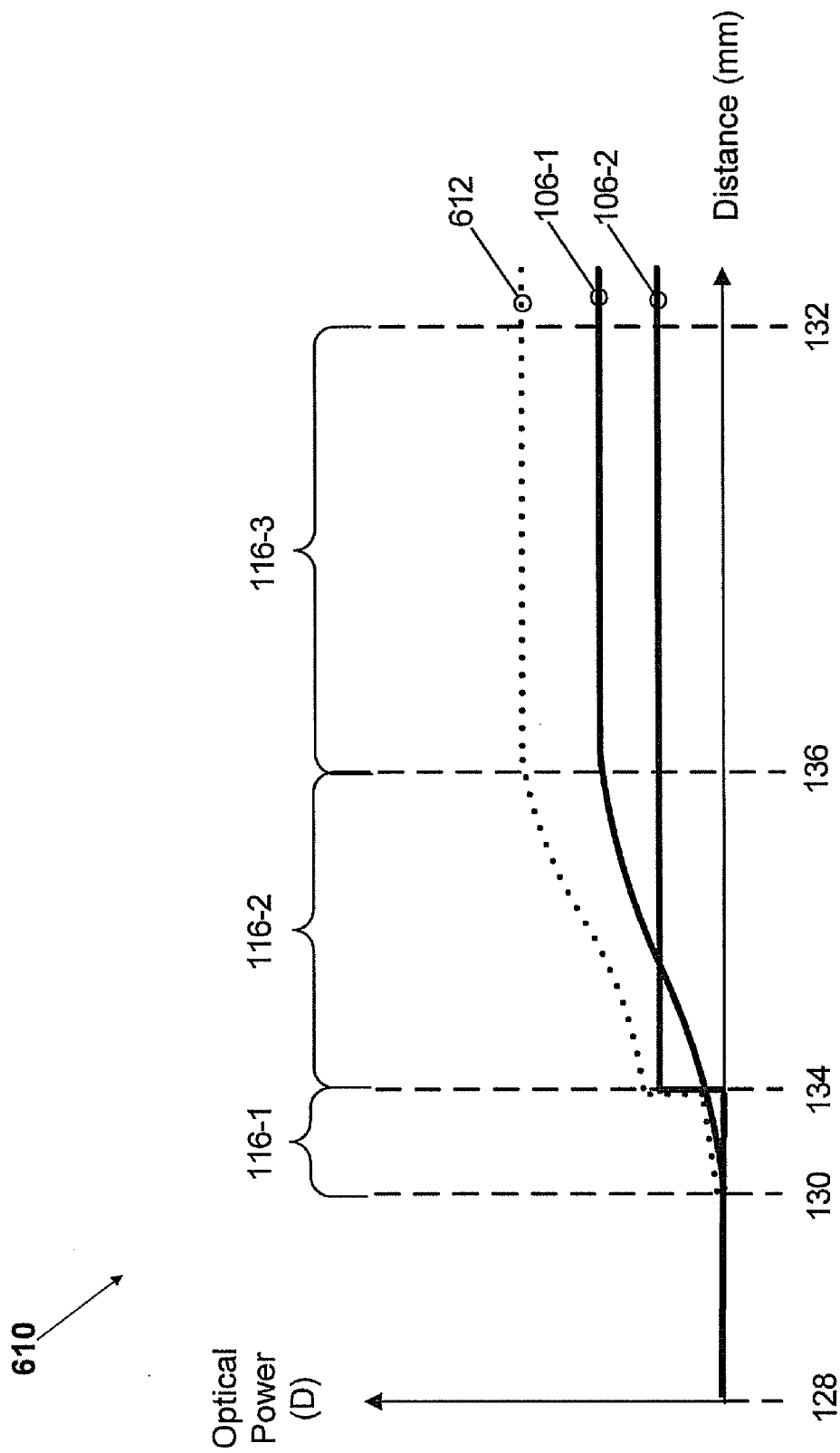
FIG. 6C illustrates an optical power profile of the two-layer composite lens depicted in FIG. 4C.

FIG. 4C illustrates another alternative alignment of the spherical incremental add power region 106-2 and the progressive addition optical power region 106-2. Specifically, FIG. 4C depicts the progressive additional optical power region 106-2 starting or beginning approximately 4 mm below the fitting point 128. The spherical incremental add power segment 106-2 can begin approximately 3 mm below the top or start of the progressive addition optical power region 106-1. This possible alignment of the spherical incremental add power region 106-2 and the progressive additional optical power region 106-2 can also provide two stable vision zones—vision zones 116-1 and 116-3. Vision zone 116-2 can have any height defined by the distance between the boundaries 134 and 136 such as, for example, 9 mm. FIG. 6C illustrates a possible optical power profile 610 of the multilayer composite lens 300 as depicted in FIG. 4C. As shown, the optical power provided by the vision zone 116-1 is contributed by the progressive optical power region 106-1 alone as the optical power contributed in part by the spherical incremental add power segment 106-2 does not begin until approximately the boundary 134. The progressive additional optical power region 106-1 can have a small ramp up in optical power (e.g., 0.1 D) between the boundary 130 and the boundary 134 and can have a larger ramp up in optical power between the boundary 134 and the boundary 136. The placement of the spherical incremental add power segment 106-2 at the boundary 134 can introduce a discontinuity at approximately the boundary 134. The profile curve 612 represents the overall optical power profile resulting from the spherical incremental add power segment 106-2 being in optical communication with the progressive optical power region 106-1 as described above in relation to FIG. 4C.

FIG. 6A depicts an example optical power profile with a far-intermediate vision zone 116-1 that can be perceived by a wearer of the lens as being continuous with the intermediate zone 116-2 and discontinuous with the far distance zone 120. Alternatively, FIG. 6C depicts an example optical power profile with a far-intermediate vision zone 116-1 that can be perceived by a wearer of the lens as being discontinuous with the intermediate zone 116-2 and discontinuous with the far distance zone 120.

Figure 7:
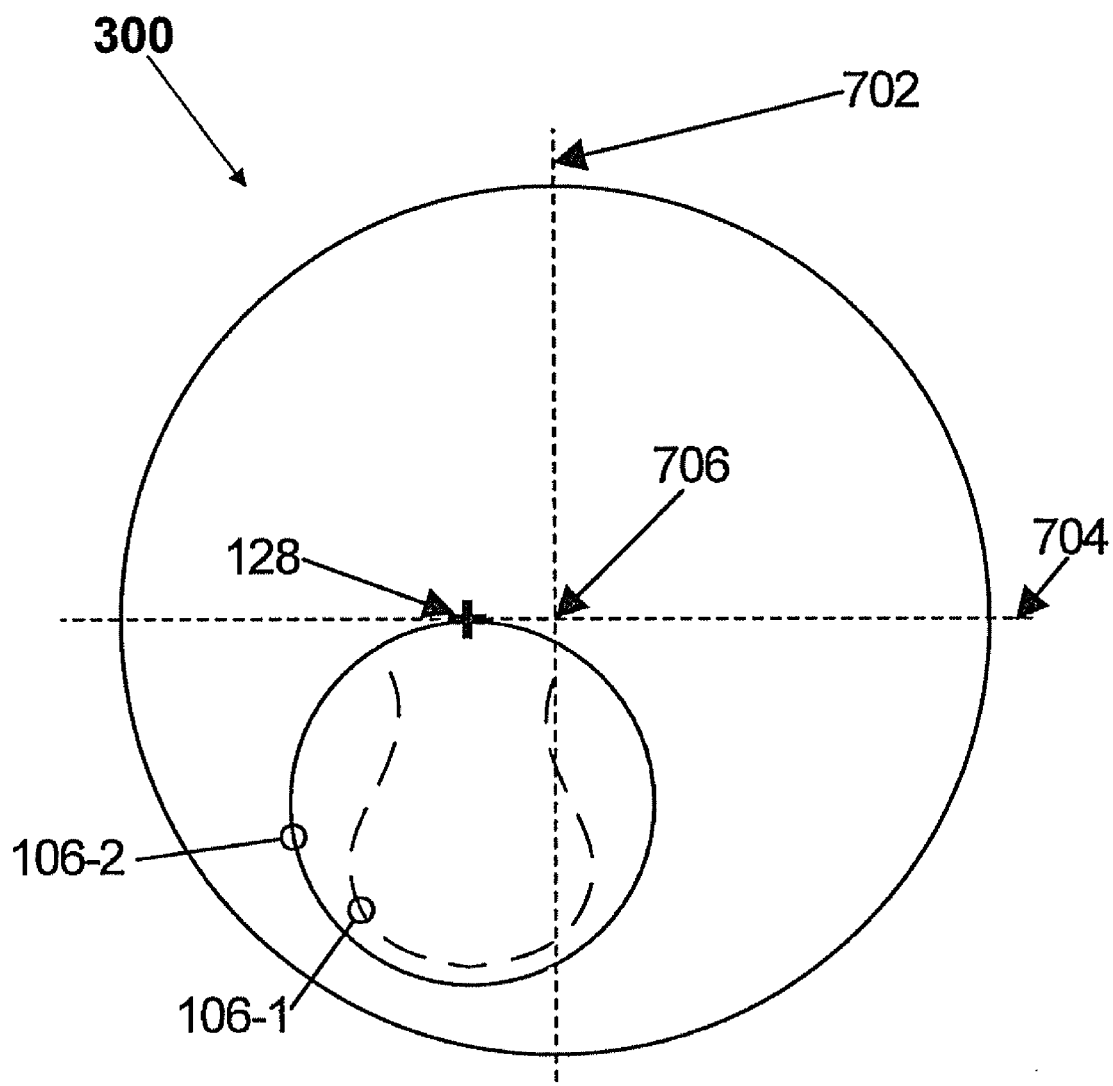
FIG. 7 illustrates a front view of the two-layer composite lens of FIG. 3 according to an aspect of the present invention.

FIG. 7 illustrates a front view of the two-layer composite lens 300 according to an aspect of the present invention. In particular, FIG. 7 illustrates a possible orientation and positioning of the enhanced optical regions 106-1 and 106-2 de-centered nasally relative to a geometric center 706 of the two-layer composite lens 300 intended for use as a left eye lens. As show in FIG. 7, the geometric center 706 of the two layer composite lens 300 is defined by the intersection of a vertical axis of symmetry 702 and a horizontal axis of symmetry 704. The fitting point 128 is located on the horizontal axis of symmetry but is not so limited. The fitting point 128 can be offset from the geometric center 706 of the two-layer composite lens 300. As an example, the fitting point 128 can be offset to the left of the geometric center 706. Further, the fitting point 128 can be offset above or below the geometric center 706.

Figure 8:
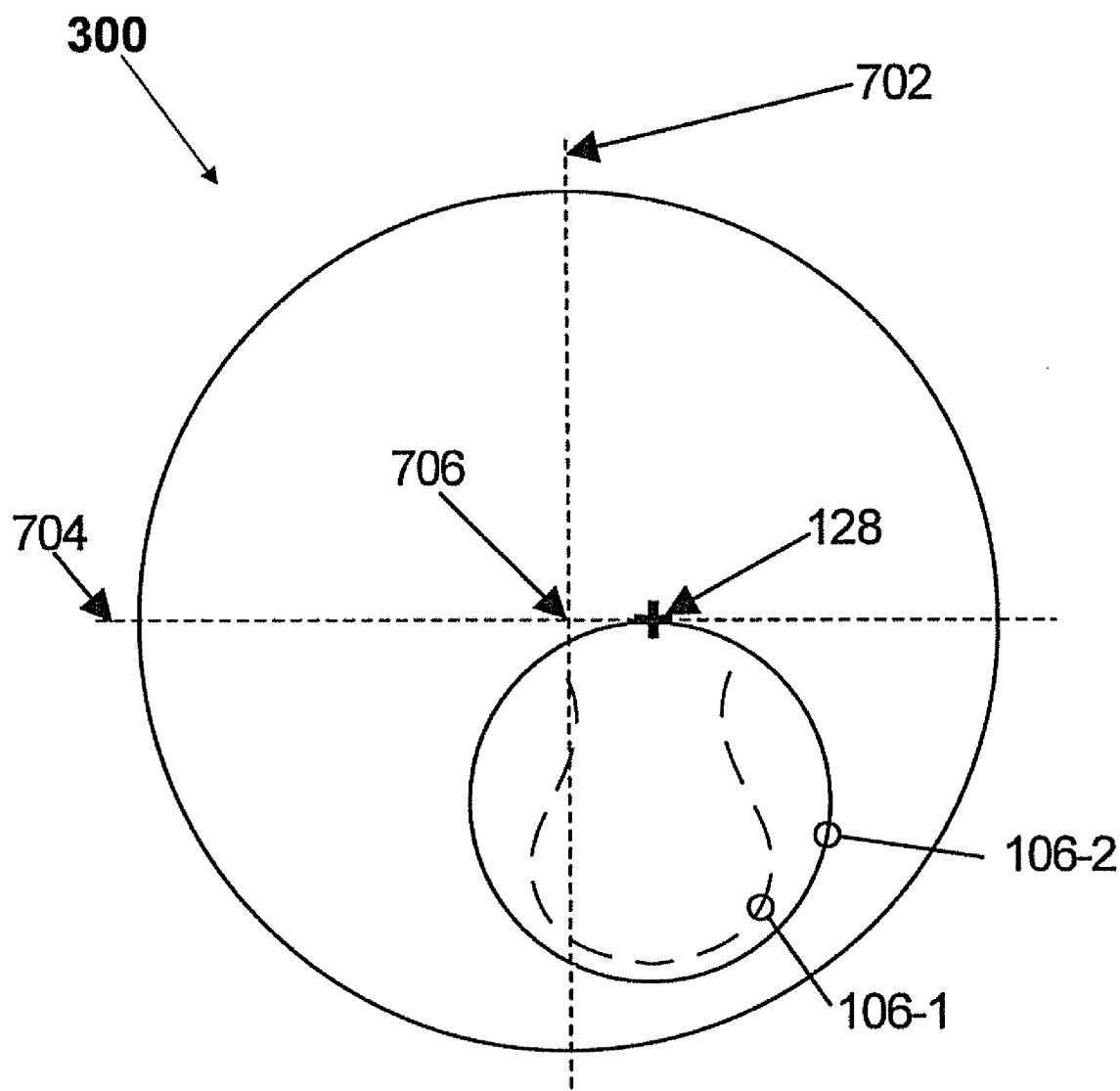
FIG. 8 illustrates a front view of the two-layer composite lens of FIG. 3 according to an aspect of the present invention.

FIG. 8 illustrates a front view of the two-layer composite lens 300 according to an aspect of the present invention. In particular, FIG. 8 illustrates a possible orientation and positioning of the enhanced optical regions 106-1 and 106-2 de-centered nasally relative to a geometric center 706 of the two-layer composite lens 300 intended for use as a right eye lens. As show in FIG. 8, the geometric center 706 of the two layer composite lens 300 is defined by the intersection of the vertical axis of symmetry 702 and the horizontal axis of symmetry 704. The fitting point 128 is located on the horizontal axis of symmetry but is not so limited. The fitting point 128 can be offset from the geometric center 706 of the two-layer composite lens 300. As an example, the fitting point can be offset to the right of the geometric center 706.

Figure 15:
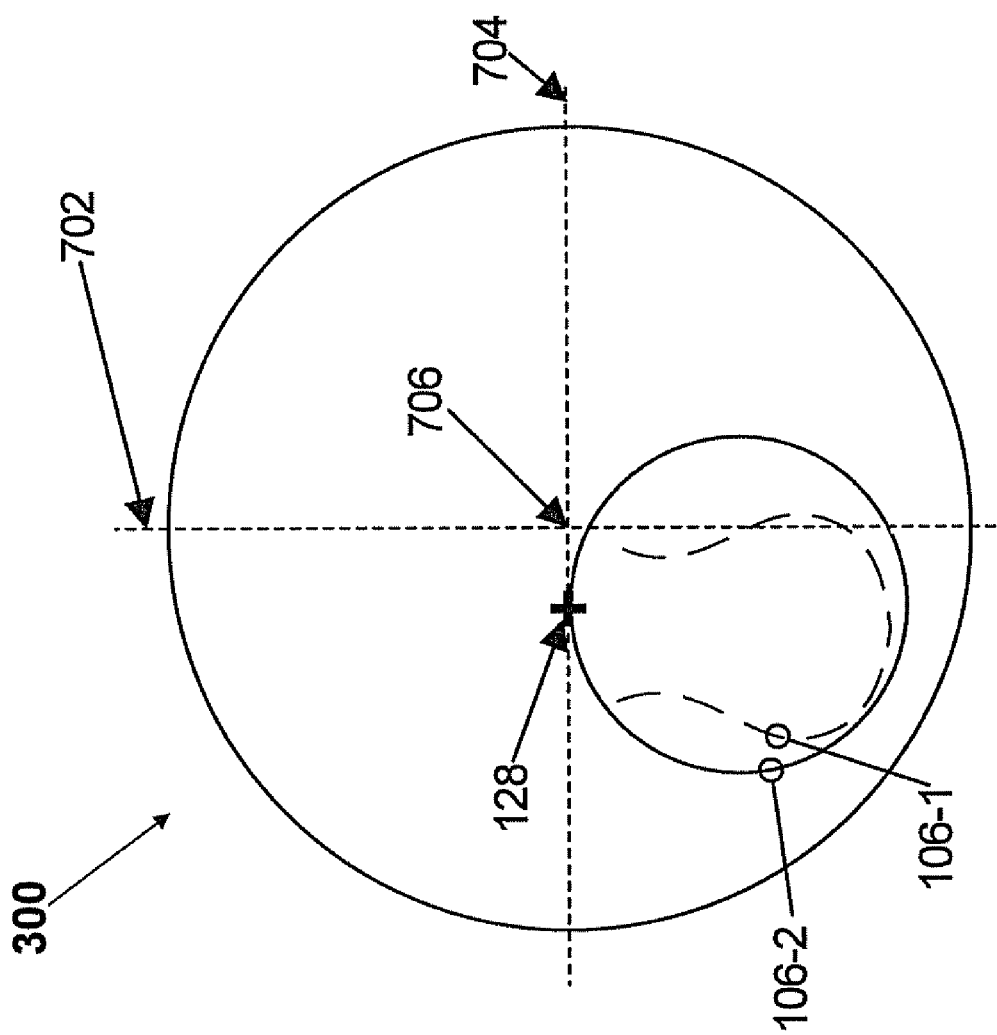
FIG. 15 illustrates a front view of the two-layer composite lens of FIG. 3 according to an aspect of the present invention.
Figure 16:
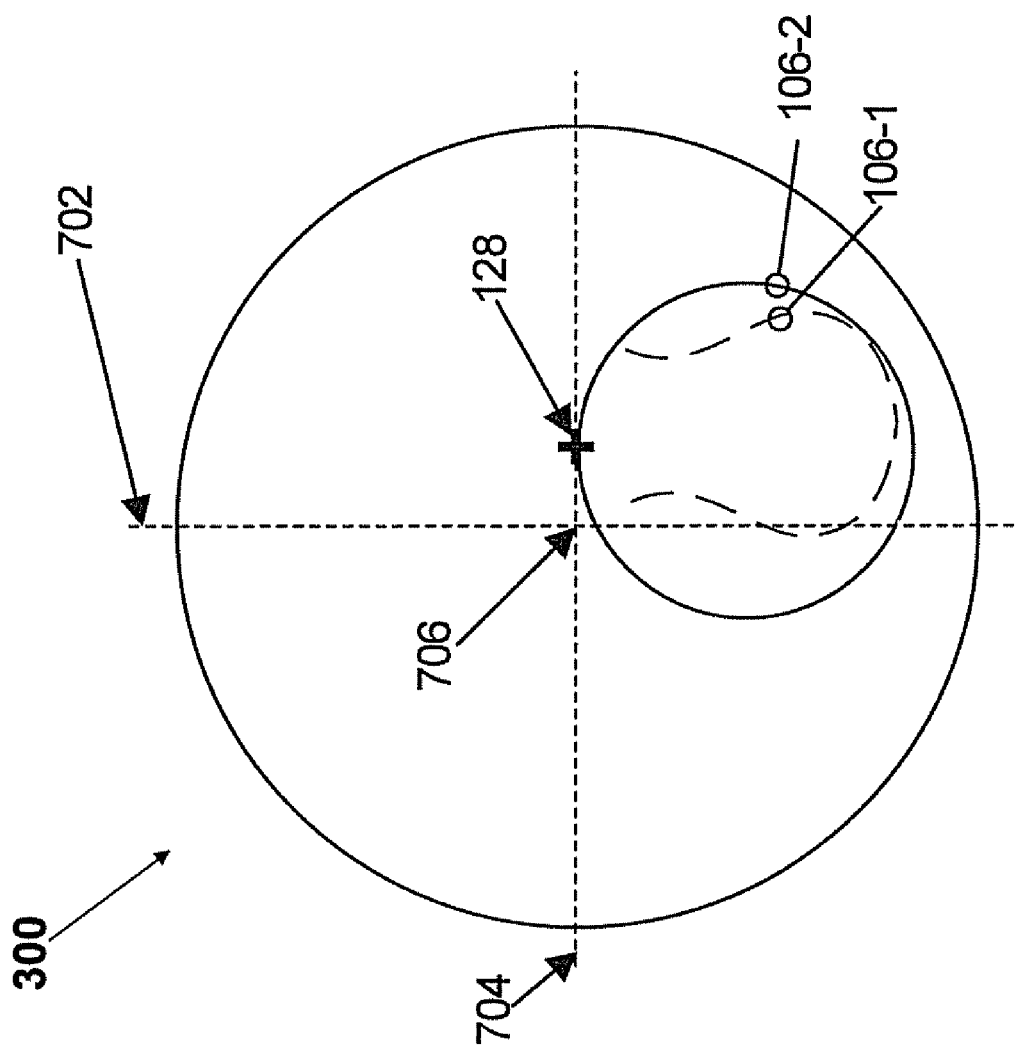
FIG. 16 illustrates a front view of the two-layer composite lens of FIG. 3 according to an aspect of the present invention.

FIGS. 15-18 illustrate possible variations in the orientations of the enhanced optical region 106-1 and the enhanced optical region 106-2 relative to one another and relative to the geometric center 702. Specifically, FIG. 15 depicts an example of a left-eye lens of the present invention with the enhanced optical region 106-1 offset from the geometric center 702 and the enhanced optical region 106-2 offset relative to a center of the enhanced optical region 106-1. As an example, the enhanced optical region 106-2 can be offset relative to the center of the enhanced optical region 106-1 by 2.5 mm. FIG. 16 depicts an example of a right-eye lens of the present invention corresponding to the lens depicted in FIG. 15. FIG. 16 shows the enhanced optical region 106-1 offset from the geometric center 702 and the enhanced optical region 106-2 offset relative to a center of the enhanced optical region 106-1. As an example, the enhanced optical region 106-2 can be offset relative to the center of the enhanced optical region 106-1 by 2.5 mm.

Figure 17:
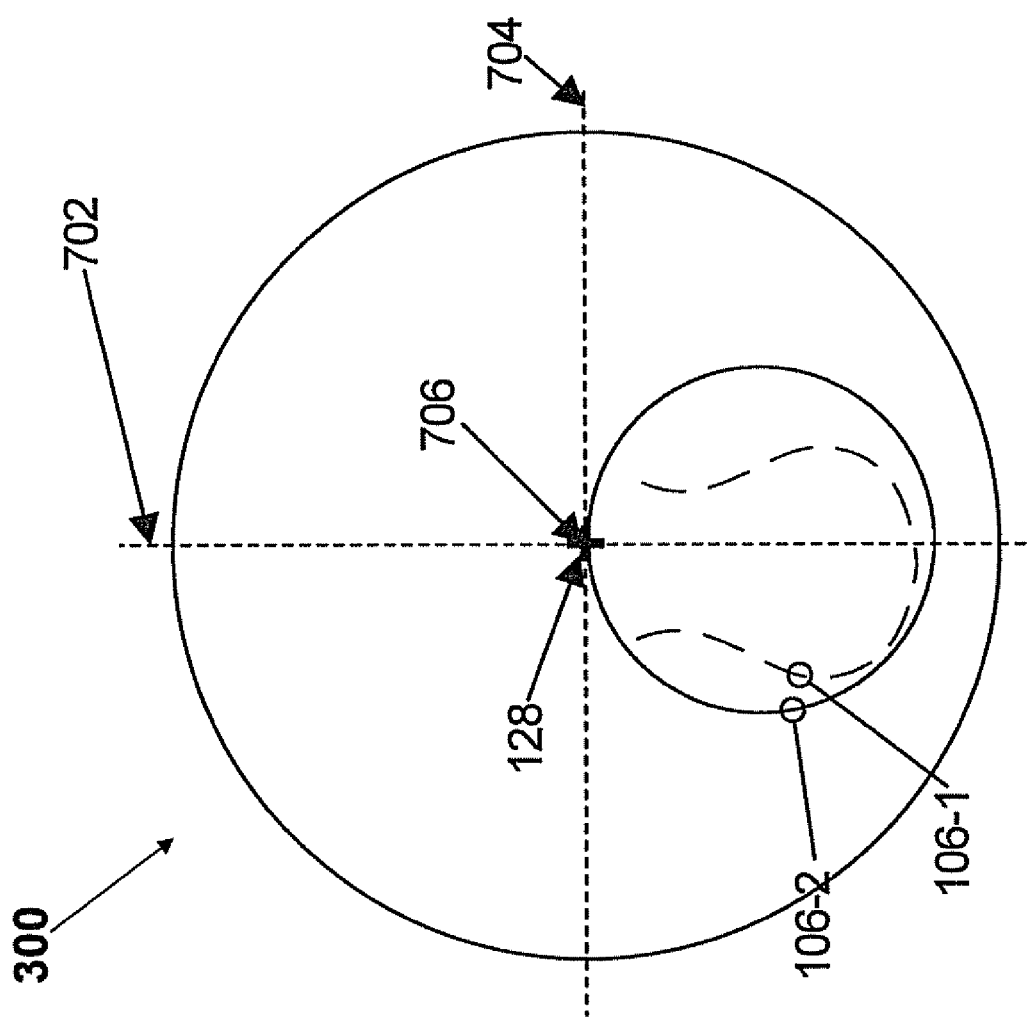
FIG. 17 illustrates a front view of the two-layer composite lens of FIG. 3 according to an aspect of the present invention.
Figure 18:
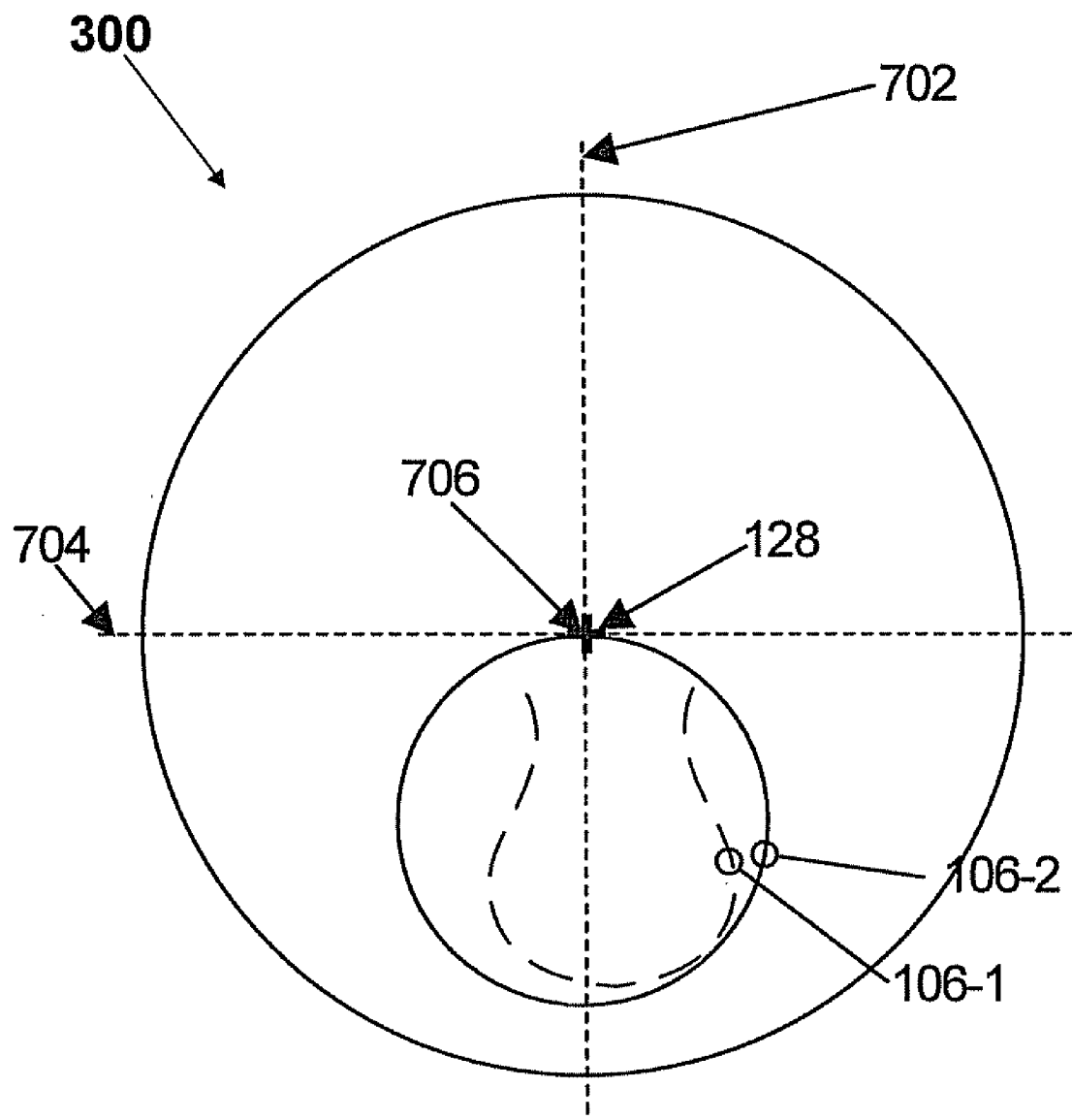
FIG. 18 illustrates a front view of the two-layer composite lens of FIG. 3 according to an aspect of the present invention.

FIG. 17 depicts an example of a left-eye lens of the present invention with the enhanced optical region 106-1 centered about the geometric center 702 and the enhanced optical region 106-2 offset relative to a center of the enhanced optical region 106-1. As an example, the enhanced optical region 106-2 can be offset relative to the center of the enhanced optical region 106-1 by 2.5 mm. FIG. 18 depicts an example of a right-eye lens of the present invention corresponding to the lens depicted in FIG. 17. FIG. 18 shows the enhanced optical region 106-1 centered about the geometric center 702 and the enhanced optical region 106-2 offset relative to a center of the enhanced optical region 106-1. As an example, the enhanced optical region 106-2 can be offset relative to the center of the enhanced optical region 106-1 by 2.5 mm. As discussed above, for each of the lenses depicted in FIGS. 7-8 and 15-18, the fitting point 128 of the lens can be positioned anywhere on the lens including above, below or to the left or right of the geometric center 702 with the enhanced optical regions 106-1 and 106-2 positioned below the fitting point 128 as desired.

As will be appreciated by one skilled in the pertinent art(s), variations in form and detail of the two-layer composite lens 100 and the three-layer composite lens 300 can be made without departing from the spirit and scope of the invention. For purposes of clarity, non-limiting variations in several design parameters of the two-layer composite lens 100/300 are given in the following table.

TABLE I

| Parameter(s) | Possible Non-Limiting Variation(s) |
| --- | --- |
| $n_1/n_2$ combinations | In general, any combination is possible. Example $n_1/n_2$ combinations:<br>1.50/1.60<br>1.53/1.60<br>1.53/1.67<br>1.53/1.71<br>1.60/1.71<br>1.53/1.74<br>1.60/1.74<br>1.60/1.67 |

TABLE I-continued

| Parameter(s) | Possible Non-Limiting Variation(s) |
|---|---|
| Types of materials (e.g., for the first layer 102 and/or the second layer 104) | Generally, any first substantially homogeneous material having a first index of refraction that can bond to a second substantially homogenous material having a second index of refraction different from the first index of refraction. Such materials can include, but are not limited to, glass and plastics. Specific optical grade materials that are commercially available are: PPG CR39 PPG HiRi Polycarbonate PPG Trivex 1.53 and 1.60 Nouryset 200 Rav-7 MR-6 MR-7 MR-8 MR-10 MR-20 MR-90 Brite-5 Brite-60 Brite-Super TS216 UDEL P-1700 NT-06 Radel A-300 NT Radel R-5000 NT 1.7 Mitsui 1.74 MGC 1.74 Mitsui (MR-174) High-refractive index episulfide resin monomer (HIE)/episulfide material Polysulfone Polyimide Polyetherimide |
| Width of the second enhanced optical region 106-2 as a substantially spherical or aspherical segment | Generally, any diameter is possible. Example widths: any diameter from ~20 mm to ~40 mm in ~0.25 mm increments |
| Thickness of first layer - unfinished (e.g., the first layer 102) | ~0.2 mm or greater |
| Thickness of first layer - finished (e.g., the first layer 102) | ~0.2 mm to ~1.0 mm or greater |
| Thickness of second layer - unfinished (e.g., the second layer 104) | ~3.0 mm to ~7.0 mm or greater |
| Thickness of second layer - finished (e.g., the second layer 104) | .2 mm to 2 mm or greater |
| Overall thickness of two-layer composite lens - unfinished or semi-finished | Semi-finished: ~4.0 mm to ~8.0 mm or greater Unfinished: ~2.5 mm to ~12 mm |
| Center thickness of two-layer composite lens - finished, myopic prescription | Minimum range: ~0.5 mm to ~2.0 mm Maximum range: ~1.0 to ~3.0 mm |
| Optical power of the of the second enhanced optical region 106-2 (e.g., as a substantially spherical or aspherical segment) | Generally, any optical power is possible. Example optical powers: any optical power from ~+0.12 D to ~+6.0 D in air in +0.12 D increments |
| Maximum optical power of the first enhanced optical region 106-1 (e.g., as a progressive structure) | Generally, any maximum optical power is possible. Typical optical powers: any optical power from ~+0.50 D to ~+2.75 D in air in +0.12 D increments |
| Shape of curve of second enhanced optical region 106-2 as a refractive curve | Generally, any shape is possible. Example shapes: spherical substantially spherical aspheric |
| Minimum difference in refractive indices between first and second layers (e.g., minimum $\Delta n$, where $\Delta n = n_2 - n_1$) | Generally, any non-zero difference is possible. As an example, $\Delta n \geq 0.01$. Preferably greater than or equal to ~.05. |

TABLE I-continued

| Parameter(s) | Possible Non-Limiting Variation(s) |
| --- | --- |
| Shape of covered refractive surface (e.g., shape of the second enhanced optical region 106-2 as a refractive surface having substantially constant radius of curvature) | Generally, any shape is possible. Example shapes: round oval substantially round elliptical flat-top curved |
| Horizontal position of the top of the second enhanced optical region 106-2 relative to fitting point 128 | Generally, any positioning is possible. Example positioning: ~2.0 mm–~4.0 mm de-centered nasally |
| Horizontal position of the top of the first enhanced optical region 106-1 relative to fitting point 128. | Generally, any positioning is possible. Example positioning: ~2.0 mm–~4.0 mm decentered nasally |
| Vertical position of the top of the second enhanced optical region 106-2 relative to fitting point 128 | Generally, any positioning is possible. Example positioning: Starts ~2.0 mm–~6.0 mm below fitting point 128 Preferred is ~3.0 mm to ~5.0 mm below |
| Vertical position of the top of the first enhanced optical region 106-1 relative to fitting point 128. | Generally, any positioning is possible. Example positioning: Starts ~0 mm–~10.0 mm below fitting point 128 |
| Power of far-intermediate zone as percentage of total add power | Generally, any optical power is possible. Example optical power ranges: ~20%–~44% |
| Power of intermediate zone as percentage of total add power | Generally, any optical power is possible. Example optical power ranges: ~45%–~55% |
| Power split between $1^{st}$ and $2^{nd}$ incremental add power contributors | Generally, any power split is possible. Percentage contribution of second enhanced optical power region 106-2 (e.g., as a substantially spherical segment): 20% to 95%, more typically ~20%–~44% Percentage contribution of first enhanced optical power region 106-1 (e.g., as a progressive structure): 5% to 80%, more typically ~80%–~56% |

Figure 9:
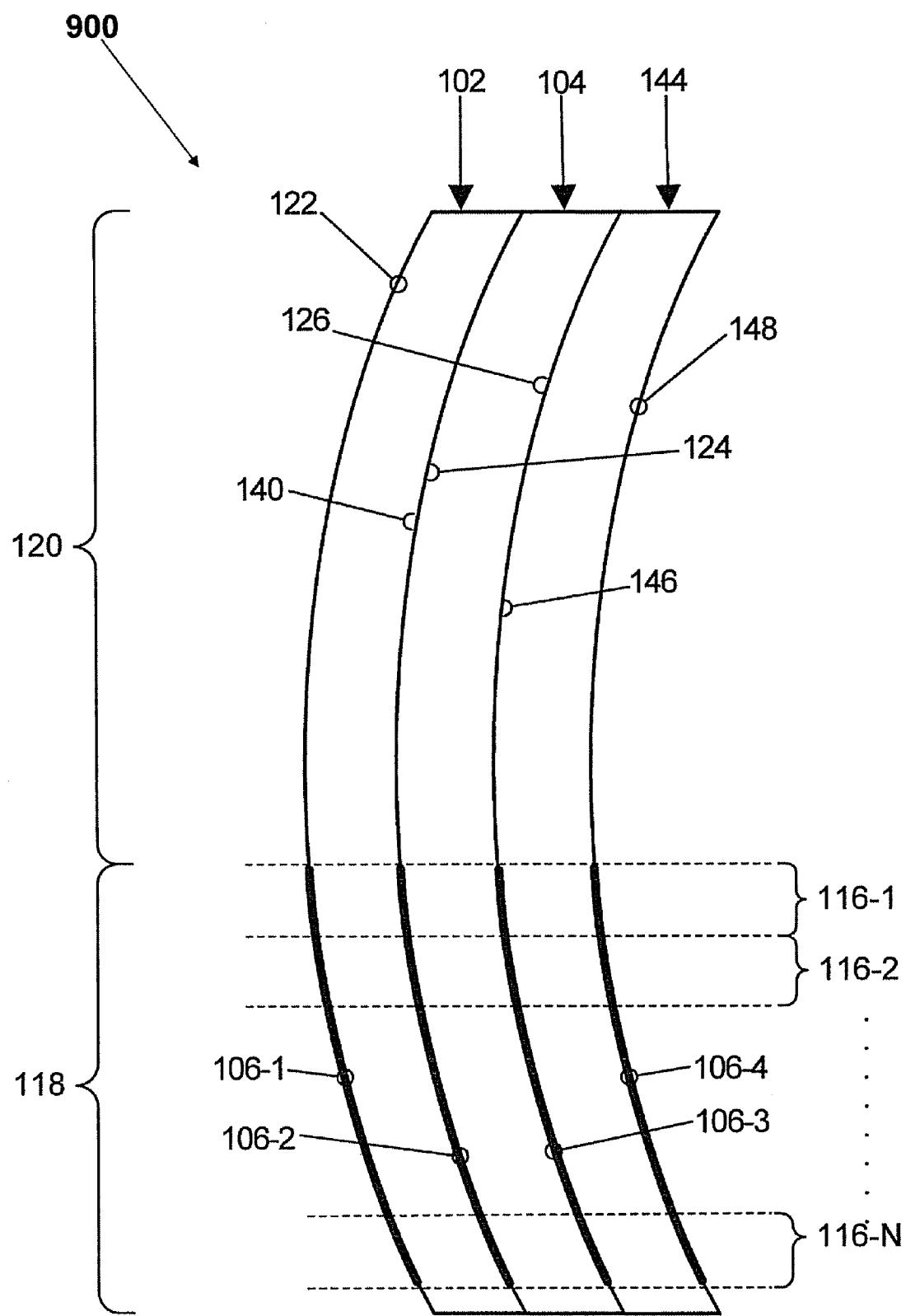
FIG. 9 illustrates a side view of a three-layer composite lens according to an aspect of the present invention.

FIG. 9 illustrates a side view of a three-layer composite lens 900 according to an aspect of the present invention. The three-layer composite lens 900 comprises the first layer 102, the second layer 104 and a third layer 144. As shown in FIG. 9, the three-layer composite lens 900 comprises elements at least depicted and described in relation to the two-layer composite lens 100 of FIGS. 1 and 2. Accordingly, it is intended that like reference numbers indicate substantially the same components as will be appreciated by one having skill in the pertinent art(s). As such, any previous description of characteristics of any identical elements is intended to be incorporated into the description of features of the three-layer composite lens 900.

The third layer 144 can comprise a third material having a third index of refraction, $n_3$. The third material can comprise a material that is different from the first material of the first layer 102 and the second material of the second layer 104. Alternatively, the third material of the third layer 144 can comprise a material that is substantially the same as first material of the first layer 102 or the second material of the second layer 102. Further, the third material can be substantially homogeneous.

The third material can be any material such as, but not limited to, any plastic or glass. Depending upon the selection of the third material, the third index of refraction, $n_3$, can be the same as either the first index of refraction, $n_1$, or the second index of refraction, $n_2$. Alternatively, the third index of refraction can be different from the first index of refraction, $n_1$, and the second index of refraction, $n_2$.

As shown in FIG. 9, the first layer 102 can form an anterior surface and the third layer 144 can form a posterior surface of the three-layer composite lens 900, such that the third layer 144 is intended to be located closer to a wearer's eye.

The three-layer composite lens 900 can represent a finished lens, a finished lens blank, a semi-finished lens blank or a non-finished lens blank. More specifically, the two-layer composite lens 900 can be a finished lens (edged and ready to mount in a frame), a finished lens blank (finished on both outer surfaces but not yet edged), a semi-finished lens blank (finished on a first outer surface and not finished on a second outer surface) or a non-finished lens blank (having neither outer surface finished). The two-layer composite lens 900 can be subjected to any known lens treatments or coatings prior to forming a final ophthalmic lens as will be appreciated by one skilled in the pertinent art(s).

The three-layer composite lens 900 can comprise four enhanced optical regions 106-1, 106-2, 106-3 and 106-4. The enhanced optical region 106-3 can be positioned on the surface 126 or on a surface 146 of the third layer 144. The enhanced optical region 106-4 can be positioned on a surface 146. The enhanced optical regions 106 can be aligned in any desired manner to be in optical communication with one another to form vision zones 116-1 through 116-N. The three layers 102, 104 and 144 can also form a first distance zone (e.g., a far distance vision zone) 120. Variations in the optical powers contributed by and the positioning and sizing of the enhanced optical regions can be varied as was discussed in relation to the two-layer composited lenses 100 and 300 discussed above and as one skilled in the pertinent art(s) would appreciate.

As will be appreciated by one skilled in the pertinent art(s), the distance power of the three-layer composite lens 900 can be determined by a curvature of the surface 146 and 148. In particular, when the first layer 102 and the second layer 104 are conformal—i.e., the surfaces 122, 140, 124 and 126 have curvatures that are substantially the same as the curvature of the surface 146 in the distance zone 120—then the back layer 144 can determine the distance power of the three-layer composite lens 900. As will be appreciated by one skilled in the pertinent art(s), this result is applicable to the two-layer composite lens 100—i.e., when the surfaces 122 and 140 have curvatures that are substantially the same as the curvature of the surface 124 in the distance zone 120—then the back layer 104 can determine the distance power of the three-layer composite lens 100.

Figure 10:
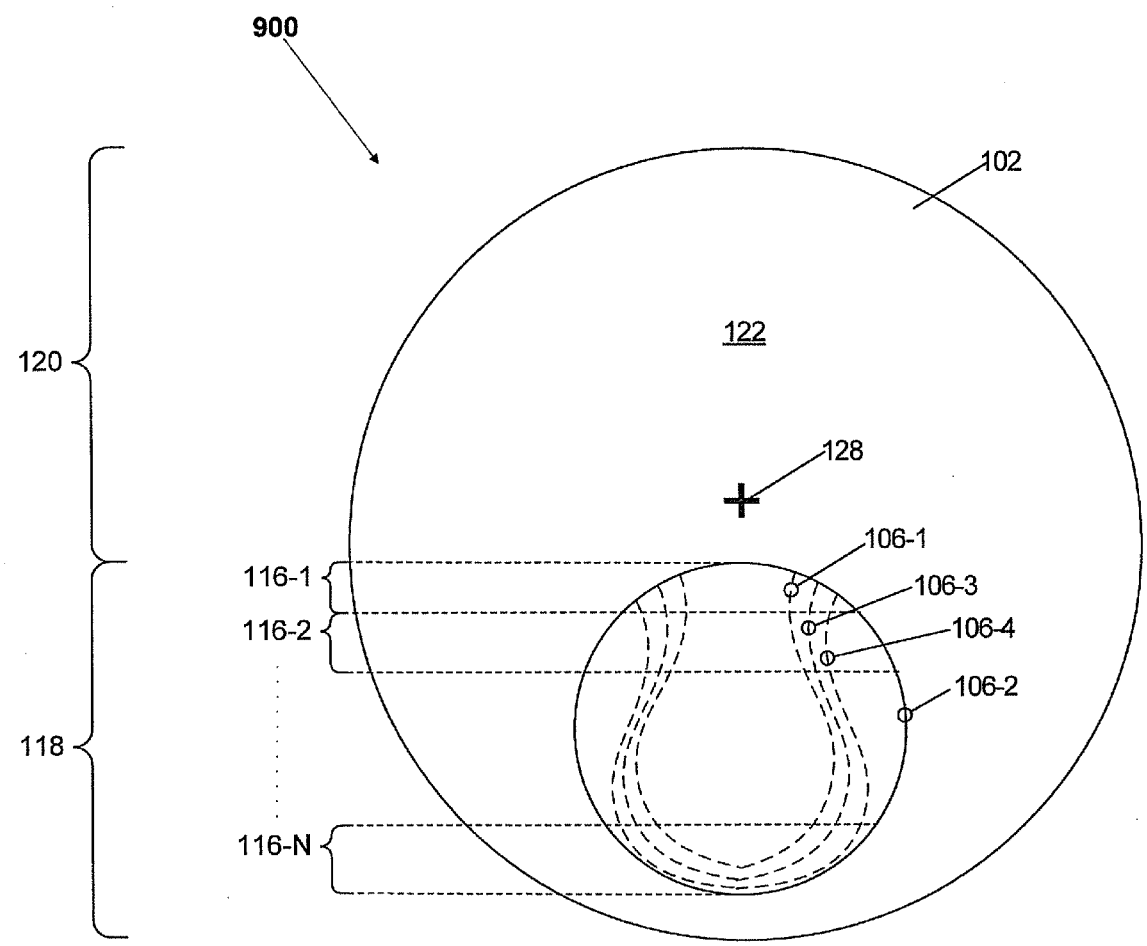
FIG. 10 illustrates a front view of the three-layer composite lens of FIG. 9 according to an aspect of the present invention.

FIG. 10 illustrates a front view of the three-layer composite lens 900 according to an aspect of the present invention. The front view of the three-layer composite lens 900 is a view directed at the front layer 102 of the three-layer composite lens 900. For purposes of illustration and clarity only, the enhanced optical region 106-1 is depicted as a first progressive surface, the enhanced optical region 106-2 is depicted as a round substantially spherical surface, the enhanced optical region 106-3 is depicted as a second progressive surface and the enhanced optical region 106-4 is depicted as a third progressive surface. As shown, the enhanced optical regions 106 can be positioned to be in optical communication with one another so as to form vision zones 116 in the lower portion 118 of the three-layer composite lens 900.

Overall, the multiple layer multifocal composite lens of the present invention provides numerous advantages over prior art lenses. The multiple layer multifocal composite lens of the present invention can provide multiple stable vision zones. For example, as described in relation to FIG. 4A above, the multiple layer multifocal composite lens of the present invention can provide a total of four distinct vision zones with three of the zones providing stable vision. Further, these vision zones, as an example, can be provided with as few as only one discontinuity. The introduced discontinuity, due to the composite structure of the lens and placement of the spherical add power segment behind a first layer of the lens, can have a reduced visibility when seen by an observer looking at a wearer of the lens.

Any introduced discontinuity can be positioned well below the fitting point of the lens to increase the cosmetic appeal of the lens while not interfering with distance vision gaze. In addition, the positioning of the discontinuity enables a lens of the present invention to be used as an occupational or computer lens. This is generally due to the discontinuity not being positioned neither too high nor too low—e.g., 3-5 mm below the fitting point of the lens—and acceptable for most applications of the lens. In particular, any introduced discontinuity can be positioned no greater than 10 mm below the fitting point (approximately 4 mm below the fitting point as described in relation to FIG. 4A). This positioning enables a buried constant optical add power segment to contribute to the add power of the lens while not being positioned where it would interfere with a wearer's line of sight.

The multiple layer multifocal composite lens of the present invention can also exploit the benefits of a refractive progressive optical power structure while minimizing any unwanted astigmatism introduced by such a structure. As an example, the multiple layer multifocal composite lens of the present invention as described in relation to FIG. 4A, can position a progressive optical power region to begin or start at or near a discontinuity introduced by a buried spherical add power segment. Overall, the start of the progressive structure can begin at any position greater than 2 mm below the fitting point of the lens. This is contrary to traditional progressive lenses which begin progressive structures within 1 mm of the fitting point. By positioning the progressive structure lower than prior art lenses, the multiple layer multifocal composite lens of the present invention can push any unwanted astigmatism down and into the periphery of the lens and therefore the wearer's field of vision so as to be less disruptive.

Further, the multiple layer multifocal composite lens of the present invention can use a progressive structure that provides a slow ramp up in power to help provide a stable vision zone. A progressive structure used by the multiple layer multifocal composite lens of the present invention, as described in relation to FIG. 4A, can reach an optical power of approximately 0.1D 7 mm or below the fitting point of the lens. This slow ramp of power limits the introduction of unwanted astigmatism and therefore widens the channel of the progressive structure relative to prior art lenses. Lastly, because the progressive structure provides only a portion of the total near add power of the multiple layer multifocal composite lens of the present invention, unwanted astigmatism is reduced as compared to a traditional progressive lens providing the same add power.

As will be appreciated by one skilled in the pertinent art(s), the principles described herein with respect to a multiple-layer lens are applicable to a single layer lens. That is, the present invention includes a single layer lens comprising a first incremental add power region—e.g., a refractive progressive optical power region—and a second incremental add power region—e.g., a spherical, substantially spherical, aspheric or any combination thereof segment—that are positioned to be in optical communication to obtain the beneficial lens characteristics described herein. As an example, a single layer lens of the present invention can include a substantially spherical segment positioned on a front surface (e.g., an anterior surface) of the lens and a refractive progressive optical power region positioned on a back surface (e.g., a posterior surface) of the lens. The spherical segment can be fabricated by mold while the progressive region can be fabricated by mold or by free-forming.

CONCLUSION

While various embodiments of the present invention have been described above, it should be understood that they have been presented by way of example and not limitation. As such, all optical powers, add powers, incremental add powers, optical power ranges, refractive indices, refractive index ranges, thicknesses, thickness ranges, distances from the fitting point of the lens, and diameter measurements that have been provided are examples only and are not intended to be limiting. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A lens, comprising:
   a distance vision zone, a far-intermediate vision zone, an intermediate vision zone and a near vision zone;
   a first layer comprising a first index of refraction;
   a second layer comprising a second index of refraction different than the first index of refraction;
   a first surface of the first layer comprising a first incremental add power region contributing a first portion of a total add power of the lens; and
   a second surface of the second layer comprising a second incremental add power region contributing a second portion of a total add power of the lens, wherein a portion of a boundary of the second incremental add power region forms an optical discontinuity adjacent to the distance vision zone of the lens, wherein the first and second incremental add power regions are positioned to be in optical communication so as to form the far-intermediate vision zone, the intermediate vision zone and the near vision zone.

2. The lens of claim 1, wherein the first layer of the lens is anterior to the second layer of the lens and the first surface comprises an external surface of the lens.

3. The lens of claim 2, wherein the second surface comprises an internal surface of the second layer of the lens.

4. The lens of claim 2, wherein the first incremental add power region comprises a refractive progressive optical power region.

5. The lens of claim 2, wherein the second incremental add power region comprises one of a spherical, a substantially spherical, and an aspheric optical power region.

6. The lens of claim 1, wherein the second incremental add power region is positioned 5 mm or less below a fitting point of the lens.

7. The lens of claim 1, wherein at least one of the first incremental add power region and the second incremental add power region is formed by free-forming.

8. A lens, comprising:
an intermediate vision zone and a near vision zone;
a first layer comprising a first index of refraction;
a second layer comprising a second index of refraction different than the first index of refraction;
a first surface of the first layer comprising a first incremental add power zone contributing a first portion of a total add power of the lens; and
a second surface of the second layer comprising a second incremental add power zone contributing a second portion of the total add power of the lens,
wherein the first incremental add power zone and the second incremental add power zone are positioned to be in optical communication so as to form the intermediate vision zone the near vision zone,
wherein a portion of a boundary of the second incremental add power zone forms an optical discontinuity on the second surface,
wherein the first and second incremental add power zones are discontinuous with respect to one another,
wherein the intermediate vision zone and the near vision zone appear to be continuous when viewed by a wearer looking through the lens.

9. The lens of claim 8, wherein the intermediate vision zone and the near vision zone are positioned within the boundary of the second incremental add power region.

10. The lens of claim 8, wherein the first incremental add power zone comprises a refractive progressive optical power region and the second incremental add power zone comprises a substantially spherical optical power region.

11. The lens of claim 1, wherein a posterior surface of the first layer and anterior surface of the second layer are formed to substantially complement one another.

12. The lens of claim 1, further comprising a third layer between the first layer and the second layer.

13. The lens of claim 12, wherein the third layer comprises a third incremental add power region contributing a third portion of the total add power of the lens.

14. The lens of claim 12, wherein the third layer comprises a third index of refraction that is between the first index of refraction and the second index of refraction.

15. The lens of claim 1, wherein the first layer of the lens is anterior to the second layer of the lens and the first surface comprises an anterior surface of the first layer of the lens.

16. The lens of claim 8, wherein a posterior surface of the first layer and anterior surface of the second layer are formed to substantially complement one another.

17. The lens of claim 8, further comprising a third layer between the first layer and the second layer.

18. The lens of claim 17, wherein the third layer comprises a third incremental add power region contributing a third portion of the total add power of the lens.

19. The lens of claim 17, wherein the third layer comprises a third index of refraction that is between the first index of refraction and the second index of refraction.

20. The lens of claim 8, wherein the first layer of the lens is anterior to the second layer of the lens and the first surface comprises an anterior surface of the first layer of the lens.

* * * * *